(12) United States Patent
Wang et al.

(10) Patent No.: US 10,979,941 B2
(45) Date of Patent: Apr. 13, 2021

(54) METHOD AND DEVICE FOR SWITCHING A SERVING CELL AND METHOD AND DEVICE SUPPORTING ON-DEMAND SYSTEM INFORMATION MESSAGE

(71) Applicant: Samsung Electronics Co., Ltd., Suwon-si (KR)

(72) Inventors: Weiwei Wang, Beijing (CN); Xiaowan Ke, Beijing (CN); Hong Wang, Beijing (CN); Lixiang Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/712,380

(22) Filed: Dec. 12, 2019

(65) Prior Publication Data

US 2020/0120553 A1  Apr. 16, 2020

Related U.S. Application Data

(63) Continuation-in-part of application No. PCT/KR2018/006866, filed on Jun. 18, 2018.

(30) Foreign Application Priority Data

| Jun. 16, 2017 | (CN) | 201710459634.7 |
| Aug. 10, 2017 | (CN) | 201710681888.3 |
| May 9, 2018 | (CN) | 201810437646.4 |

(51) Int. Cl.
  *H04W 36/00* (2009.01)
  *H04W 36/08* (2009.01)
  *H04W 76/27* (2018.01)

(52) U.S. Cl.
  CPC ... *H04W 36/0027* (2013.01); *H04W 36/0033* (2013.01); *H04W 36/0061* (2013.01); *H04W 36/0069* (2018.08); *H04W 36/08* (2013.01); *H04W 76/27* (2018.02)

(58) Field of Classification Search
  CPC ......... H04W 36/0061; H04W 36/0069; H04W 36/08; H04W 36/0027; H04W 36/0033; H04W 76/27
  See application file for complete search history.

(56) References Cited

U.S. PATENT DOCUMENTS

| 9,071,962 B2 | 6/2015 | Janakiraman et al. |
| 9,736,705 B2 | 8/2017 | Yun et al. |

(Continued)

FOREIGN PATENT DOCUMENTS

| CN | 105612776 A | 5/2016 |
| CN | 106538034 A | 3/2017 |

(Continued)

OTHER PUBLICATIONS

3GPP TSG RAN WG3 Meeting #96, R3-171598 "TP for UE Radio Bearer Management", ZTE Corporation, May 2017, pp. 1-6.*

(Continued)

*Primary Examiner* — Jackie Zuniga Abad
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The disclosure provides a method and device for switching a serving cell.

24 Claims, 29 Drawing Sheets

(56) References Cited

U.S. PATENT DOCUMENTS

| | | |
|---|---|---|
| 2015/0365852 A1 | 12/2015 | Xu et al. |
| 2016/0044744 A1 | 2/2016 | Lee et al. |
| 2017/0127362 A1 | 5/2017 | Tavildar et al. |
| 2017/0223762 A1 | 8/2017 | Worrall et al. |
| 2018/0288826 A1* | 10/2018 | Chiba .................. H04W 76/15 |
| 2018/0368109 A1* | 12/2018 | Kim .................. H04W 72/0433 |
| 2019/0132066 A1* | 5/2019 | Park .................. H04W 36/0094 |

FOREIGN PATENT DOCUMENTS

| | | |
|---|---|---|
| WO | 2016/020146 A1 | 2/2016 |
| WO | 2016/021821 A1 | 2/2016 |
| WO | 2016/112970 A1 | 7/2016 |

OTHER PUBLICATIONS

"3rd Generation Partnership Project; Technical Specification Group Radio Access Network; NG-RAN; Architecture description (Release 15)", 3GPP Draft; 38.401-010-RM, 3rd Generation Partnership Project (3GPP), Mobile Competence Centre; 650, Route Des Lucioles; F-06921 Sophia-Antipolis Cedex; France, Jun. 2, 2017, XP051286180.

Nokia et al., "Introduction of F1 interface functions", 3GPP Draft; R3-171436 38.473 Introduction of FI Interface Functions. 3rd Generation Partnership Project (3GPP). Mobile Competence Centre; 650, Route Des Lucioles; F-06921 Sophia-Antipolis Cedex; FR, vol. RAN WG3, No. Hangzhou. China; May 15, 2017-May 19, 2017, May 14, 2017, XP051276227.

Catt, "Consideration on the RRC message transfer between CU and DU", 3GPP T5G RAN WG3 Meeting #96, Hangzhou,China, May 15-19, 2017, R3-171456, May 19, 2017.

Samsung, KT, SK Telecom, "On-demand 51 support in high layer functional split", 3GPP T5G-RAN Ad Hoc, Qingdao, P. R. China, Jun. 27-29, 2017, R3-172250, Jun. 20, 2017.

Extended European Search Report dated Aug. 25, 2020, issued in European Application No. 18817615.0-1212.

Chinese Office Action dated Nov. 4, 2020, issued in Chinese Application No. 201810437646 .4.

* cited by examiner

METHOD AND DEVICE FOR SWITCHING A SERVING CELL AND METHOD AND DEVICE SUPPORTING ON-DEMAND SYSTEM INFORMATION MESSAGE

CROSS-REFERENCE TO RELATED APPLICATION(S)

This application is a continuation-in-part application, claiming the benefit under § 365(c), of an International application filed on Jun. 18, 2018 and assigned application number PCT/KR2018/006866, which claimed the benefit of a Chinese patent application filed on Jun. 16, 2017 in the State Intellectual Property Office and assigned Serial number 201710459634.7, and of a Chinese patent application filed on Aug. 10, 2017 in the State Intellectual Property Office and assigned Serial number 201710681888.3, and of a Chinese patent application filed on May 9, 2018 in the State Intellectual Property Office and assigned Serial number 201810437646.4, the disclosure of each of which is incorporated by reference herein in its entirety.

TECHNICAL FIELD

The disclosure relates to radio communication and, in particular, to a method and device for switching a serving cell and a method and a device supporting on-demand system information message.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

An objective of the disclosure is to overcome at least one of the above defects, in particular, the defect that it is unallowable to release a bearer to be released while switching a serving cell.

According to one aspect of the disclosure, a method for switching a serving cell is provided. The method may comprise: a secondary node transmitting a secondary node modification required message to a master node, so that the master node could switch a serving cell and release a bearer to be released according to the secondary node modification required message; and the secondary node receiving a secondary node modification confirm message returned by the master node with respect to the secondary node modification required message.

According to another aspect of the disclosure, a method for switching a serving cell is provided. The method may comprise: a master node receiving a secondary node modification required message transmitted by a secondary node, and switching a serving cell and releasing a bearer to be released according to the secondary node modification required message; and the master node returning, to the secondary node, a secondary node modification confirm message with respect to the secondary node modification required message.

According to further another aspect of the disclosure, a device for switching a serving cell is provided. The device may comprise: a first transmitting module configured to transmit, by a secondary node, a secondary node modification required message to a master node, so that the master node could switch a serving cell and release a bearer to be released according to the secondary node modification required message; and a first receiving module configured to receive, by the secondary node, a secondary node modification confirm message returned by the master node with respect to the secondary node modification required message.

According to yet another aspect of the disclosure, a device for switching a serving cell is provided. The device may comprise: a second receiving module configured to receive, by a master node, a secondary node modification required message transmitted by a secondary node, and switch a serving cell and release a bearer to be released according to the secondary node modification required message; and a second transmitting module configured to return, by the master node, to the secondary node a secondary node modification confirm message with respect to the secondary node modification required message.

The disclosure provides a method for switching a serving cell. A secondary node transmits a secondary node modification required message to a master node, so that the master node could switch a serving cell and release a bearer to be released according to the secondary node modification required message, which provides prerequisite guarantee for subsequently releasing a UE bearer on the secondary node while switching a serving cell according to the secondary node modification required message. The secondary node receives a secondary node modification confirm message returned by the master node with respect to the secondary node modification required message, so that, if there is a bearer to be released when a serving cell is switched, the serving cell could be switched and the bearer to be released on the secondary node could be released according to the secondary node modification required message, which greatly improves signaling transmission efficiency and saves signaling resources.

The present disclosure also provides a plurality of methods and devices of on-demand system information messages to enable on-demand transmission of system information messages.

The present disclosure provides a method supporting on-demand system information message, including:

A. receiving, by a DU in a gNB from a CU in the gNB, a configuration of a PRACH used in requesting a system information message;

B. receiving, by the DU, a random access preamble for requesting a system information message from a UE;

C. determining, by the DU, information of the system information message requested by the UE based on the random access preamble and the configuration of the PRACH used in request the system information message, and sending, to the UE, the system information message requested by the UE.

Preferably, before step C, the method may also include: receiving, by the DU from the CU, configuration of on-demand system information messages which includes at least one of the following: each system information message that supports on-demand transmission, the system information message includes at least one SIB or is at least one SIB; scheduling information of each system information message that supports on-demand transmission; a relationship which associates each system information message that supports on-demand transmission with a configuration of a PRACH used in requesting the system information message; the configuration of the PRACH used in requesting a system information message includes: information about a PRACH preamble and/or information about a PRACH resource.

Preferably, the information of the system information message requested by the UE is: the system information message requested by the UE; the step C includes: determining, by the DU, a PRACH configuration corresponding to the random access preamble, and determining the system information message requested by the UE according to the relationship which associates each system information message supporting on-demand transmission with the PRACH configuration.

Preferably, the information of the system information message requested by the UE is: a PRACH configuration corresponding to the random access preamble; the step C includes: determining, by the DU, a PRACH configuration corresponding to the random access preamble, and sending the PRACH configuration to the CU; receiving, by the DU from the CU, the system information message requested by the UE, and sending the system information message to the UE.

Preferably, before the step C, the method may also include: receiving, by the DU from the CU, an index of a configuration of each PRACH used in requesting a system information message; the information of the system information message requested by the UE is: an index of a PRACH configuration; the step C includes: determining, by the DU, a PRACH configuration corresponding to the random access preamble, determining an index of the PRACH configuration, and sending the index to the CU; receiving, by the DU from the CU, the system information message requested by the UE, and sending the system information message to the UE.

Preferably, before the step C, the method may also include: receiving, by the DU from the CU, an index of a system information message corresponding to a configuration of each PRACH used in requesting a system information message; the information of the system information message requested by the UE is: an index of the system information message; the step C includes: determining, by the DU, a PRACH configuration corresponding to the random access preamble, determining an index of a system information message corresponding to the PRACH configuration, and sending the index to the CU; receiving, by the DU from the CU, the system information message requested by the UE, and sending the system information message to the UE.

Preferably, before the DU sending the system information message requested by the UE to the UE, the method may also include: sending, by the DU to the UE, an acknowledge message for indicating at least one of: confirming the network is to send the system information message requested by the UE; confirming that the random access preamble sent by the UE has been received; confirming that the random access preamble sent by the UE has been received and that the request of the UE for the system information message is acknowledged; confirming that the random access preamble sent by the UE has been received and that the request of the UE for the system information message is acknowledged and that a request has been sent to the CU; confirming that the random access preamble sent by the UE has been received and that the request of the UE for the system information message is acknowledged and that a request has been sent to the CU and that the CU has acknowledged the request of the UE.

The present disclosure also provides a method supporting on-demand system information message, including: sending, by a CU to a DU, a configuration of a PRACH used in requesting a system information message.

Preferably, the method may also include: sending, by the CU to the DU, a configuration of an on-demand system information message.

Preferably, the method may also include: receiving, by the CU from the DU, a PRACH configuration corresponding to a random access preamble sent by a UE; determining, by the CU, a system information message requested by the UE based on the PRACH configuration, and sending the system information message to the DU.

Preferably, the method may also include: sending, by the CU to the DU, an index of a configuration of each PRACH used in requesting a system information message; receiving, by the CU from the DU, an index of a PRACH configuration corresponding to a random access preamble sent by a UE; determining, by the CU, a system information message requested by the UE based on the index, and sending the system information message to the DU.

Preferably, the method may also include: sending, by the CU to the DU, an index of a system information message corresponding to a configuration of each PRACH used in requesting a system information message; receiving, by the CU from the DU, an index of a system information message corresponding to a PRACH configuration corresponding to a random access preamble sent by a UE; determining, by the CU, a system information message requested by the UE based on the index, and sending the system information message to the DU.

The present disclosure also provides a gNB-DU, including: a CU interaction module, a UE interaction module and a storage module, the CU interaction module receives, from a CU, a configuration of a PRACH used in requesting a system information message; the storage module stores the configuration of the PRACH used in requesting a system information message; and the UE interaction module receives, from a UE, a random access preamble for requesting a system information message, determines the system information message requested by the UE based on the random access preamble and the configuration of the PRACH used in requesting the system information message, and sends the system information message requested by the UE to the UE.

Preferably, the CU interaction module may receive from the CU at least one of: a configuration of an on-demand system information message; an index corresponding to each PRACH configuration; an index of a system information message corresponding to a configuration of each PRACH used in requesting a system information message.

The present disclosure also provides a gNB-CU, including: a DU interaction module, and a processing module, the DU interaction module sends, to a DU, a configuration of a PRACH used in requesting a system information message.

Preferably, the DU interaction module may also send to the DU at least one of: a configuration of an on-demand system information message; an index of each PRACH configuration; an index of a system information message corresponding to a configuration of each PRACH used in requesting a system information message.

The present disclosure also provides a method supporting on-demand system information message, including: receiving, by a gNB distributed unit (gNB-DU), a system information request from a user equipment (UE); sending a message including information of the UE to a gNB central unit (gNB-CU); receiving an acknowledgement of correctly receiving the system information request from the gNB-CU; and sending a system information message requested by the UE to the UE.

Preferably, the acknowledgement includes at least one of: identity information of the UE, an identity of a cell where the UE resides, information indicating the system information message sent by the gNB-DU to the UE.

The present disclosure provides a method supporting on-demand system information message, including: receiving, by a gNB central unit (gNB-CU) from a gNB distributed unit (gNB-DU), a message comprising information of a user equipment (UE), wherein the message comprising the information of the UE is sent by the gNB-DU after the gNB-DU receives a system information request sent by the UE; and sending an acknowledgement of correctly receiving the system information request to the gNB-DU.

Preferably, the acknowledgement includes at least one of: identity information of the UE, an identity of a cell where the UE resides, information indicating the system information message sent by the gNB-DU to the UE.

The present disclosure provides a gNB-DU, including: a first receiving module, configured to receive a system information request from a user equipment (UE); a first sending module, configured to send a message comprising information of the UE to a gNB central unit (gNB-CU); the first receiving module is configured to receive an acknowledgement of correctly receiving the system information request from the gNB-CU; and the first sending module is configured to send a system information message requested by the UE to the UE.

The present disclosure provides a gNB-CU, including: a second receiving module, configured to receive from a gNB distributed unit (gNB-DU) a message comprising information of a user equipment (UE), wherein the message comprising the information of the UE is sent by the gNB-DU after the gNB-DU receives a system information request sent by the UE; and a second sending module, configured to send an acknowledgement of correctly receiving the system information request to the gNB-DU.

It can be seen from the above technical mechanism that, the method and device supporting on-demand system information message of the present disclosure can support on-demand transmission of system information messages through interactions between a CU and a DU.

Additional aspects and advantages of the disclosure will be partially presented and become apparent from the descriptions below, or will be learned from the practices of the disclosure.

BRIEF DESCRIPTION OF THE DRAWINGS

The above and/or additional aspects and advantages of the disclosure will become apparent and be more readily appreciated from the following description of embodiments with reference to the accompanying drawings, in which.

DETAILED DESCRIPTION

Figure 1:
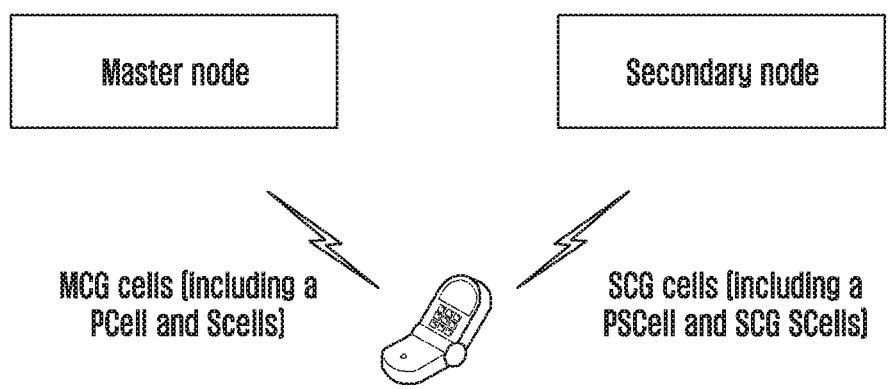
FIG. 1 illustrates a network structure of UE MR-DC in the prior art.

Embodiments of the disclosure will be described in detail hereinafter, and are illustrated in the accompanying drawings throughout which same or similar reference numerals refer to same or similar elements or elements having same or similar functions. The embodiments described with reference to the accompanying drawings are illustrative, merely used for explaining the disclosure and should not be regarded as any limitations thereto.

It will be appreciated by those skilled in the art that a singular form "a", "an", "the" or "said" used herein may include plural referents as well, unless otherwise stated. Further, an expression "comprise/comprising" or "include/including" used herein indicates presence of a corresponding feature, numerical value, step, operation, element and/or component, and does not exclude presence or addition of one or more other features, numerical values, steps, operations, elements, components, and/or combinations thereof. It should be understood that, when a component is referred to as being "connected to" or "coupled to" another component, the component may be directly connected or coupled to the another component or there may be an intermediate component therebetween. In addition, "connected to" or "coupled to" used herein may comprise wireless connection or coupling. An expression "and/or" used herein comprises all or any of one or more associated items and all combinations thereof.

It will be appreciated by those skilled in the art that, unless otherwise defined, all terms (including technical terms and scientific terms) used herein have the same meaning as commonly understood by those skilled in the art to which the disclosure belongs. Further, terms such as those defined in a general dictionary should be interpreted as meanings consistent with those in the context of the related art, and should not be interpreted as ideal or overly formal meanings, unless specifically defined herein.

It will be appreciated by those skilled in the art that "a terminal" or "a terminal device" as mentioned herein may comprise a device having merely a wireless receiver with no transmission capability, and a device having a transceiver capable of performing bidirectional communication over a bidirectional communication link. The device may comprise: a cellular or other communication device with a single-line display or a multi-line display or without a multi-line display; a Personal Communications Service (PCS) which may combine capabilities of speech, data processing, facsimile and/or data communication; a Personal Digital Assistant (PDA) which may include a RF receiver, a pager, internet/intranet access, a web browser, a notepad, a calendar and/or a Global Positioning System (GPS) receiver; or a conventional laptop and/or palmtop computer or other device having and/or including a RF receiver. "A terminal" or "a terminal device" as mentioned herein may be portable, transportable and mountable in a transport (air, sea and/or land), or may be suitable and/or configured to run locally and/or distributedly in any other place of the earth and/or space. "A terminal" or "a terminal device" as mentioned herein may also be a communication terminal, an internet terminal, or a music/video player terminal, and may be, for example, a PDA, a Mobile Internet Device (MID) and/or a mobile phone with a music/video playing function, or may be a smart TV, a set-top box, or the like.

To increase UE (user equipment) throughput, a concept of dual connectivity has been introduced into the LTE (user equipment) system, i.e. one UE may be connected to two different base stations simultaneously. In an NR (New Radio access) network or a fifth generation (5G) network, the concept of dual connectivity has been further extended and Multi-RAT Dual Connectivity (MR-DC) has been introduced, i.e. one UE may access simultaneously base stations supporting different access technologies, for example, two base stations supporting the LTE and the NR, respectively. In the discussion below, a Master Node (MN) and a Secondary Node (SN) are used to represent two base stations which a UE accesses, as illustrated in FIG. 1. Each node may use air interface access technology such as the LTE, the NR or the like. Each node may access a core network of a 5G system and may also access a core network of a 4G/LTE system. In the scenario above, the following concepts have been introduced:

Master Cell Group (MCG): a group of cells which a UE accesses on an MN. Among the MCG, one cell is a Primary Cell (PCell) and the others are Secondary Cells (SCells). Change of the PCell may trigger a random access process of the UE. In the meantime, the PCell is the first cell which the UE accesses on the MN. If a link between the UE and the PCell fails, the UE cannot communicate with the MN (even if a link with the SCell doesn't fail). Change of the SCell may not trigger a random access process of the UE.

Secondary Cell Group (SCG): a group of cells which a UE accesses on an SN. Among the SCG, one cell is a Primary SCell (PSCell) and the others are SCG Secondary Cells (SCG SCells). Change of the PSCell may trigger a random access process of the UE. In the meantime, the PSCell is the first cell which the UE accesses on the SN. If a link between the UE and the PSCell fails, the UE cannot communicate with the SN (even if a link with the SCG SCell doesn't fail). Change of the SCG SCell may not trigger a random access process of the UE.

According to TS38.321, the above mentioned PSCell and PCell can be named as special cell (SpCell). In addition, the above mentioned MCG SCells and SCG SCells can be named as SCell.

For detailed introduction of the above concepts, TS36.300 v14.2.0 may be referred to.

Under the MN and SN architecture, radio bearers for a UE comprise the following four types:

MCG Bearer: Data of the bearer will be transmitted with the UE via the MN, and all of protocol layers which process the data of the bearer are located on the MN.

MCG Split Bearer: Data of the bearer will be transmitted with the UE via the MN and the SN. However, a Packet Data Convergence Protocol (PDCP) layer which processes the data of the bearer is located on the MN, and other protocol layers, such as a Radio Link Control (RLC) layer/a Medium Access Control (MAC) layer/a Physical Layer (PHY), which process the data of the bearer are located on both the MN and the SN.

SCG Bearer: Data of the bearer will be transmitted with the UE via the SN, and all of protocol layers which process the data of the bearer are located on the SN.

SCG Split Bearer: Data of the bearer will be transmitted with the UE via the MN and the SN. However, a PDCP layer which processes the data of the bearer is located on the SN, and other protocol layers (RLC/MAC/PHY) which process the data of the bearer are located on both the MN and the SN.

For detailed introduction of the above concepts, TS37.340 may be referred to.

The above concepts regarding the cells and the bearers, respectively, are with respect to one UE.

Figure 2:
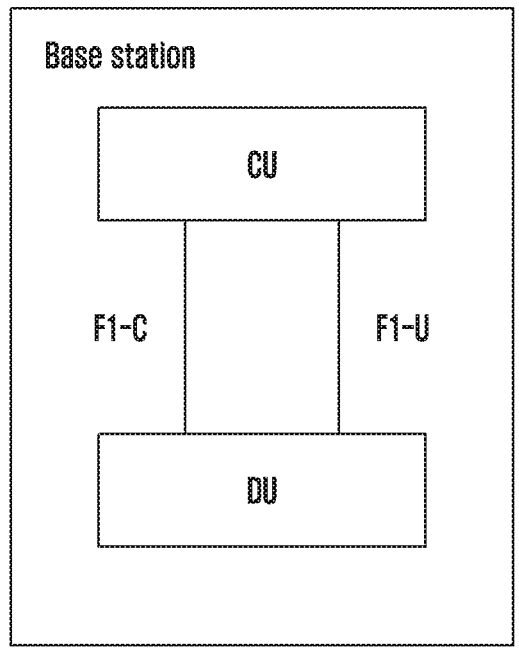
FIG. 2 illustrates a structure of a base station including a central unit and a distributed unit in the prior art.

In addition, in the NR network or the 5G network, in order to support network function virtualization and realize more efficient resource management and scheduling, a base station (for example, a gNB) for providing a radio network interface for a UE may be further divided into a Central Unit (CU) and a Distributed Unit (DU). The CU has at least a Radio Resource Control (RRC) protocol layer, a PDCP layer, etc., and may also contain a Service Data Adaptation Protocol (SDAP) layer. The DU has a RLC layer, a MAC layer, a physical layer, etc. There is a standardized public interface F1 between the CU and the DU. The F1 interface comprises F1-C for a control plane and F1-U for a user plane. A transmission network layer for the F1-C is based on IP transmission. To transmit signaling more reliably, a Stream Control Transmission Protocol (SCTP) is added to the IP. The protocol for an application layer is F1AP. The SCTP may provide reliable application layer messaging. A transmission network layer for the F1-U is User Datagram Protocol/Internet Protocol (UDP/IP). Above the UDP/IP, GPRS Tunneling Protocol for the user plane (GTP-U) is for bearing Protocol Data Units (PDUs) for the user plane. FIG. 2 shows structures of the CU and the DU.

In the above introduction, if there is an interface for a user plane serving one UE between two nodes (for example, an X2-U between the MN and the SN, an F1-U between the CU and the DU, an X2-U between the MN and the DU), a tunnel will be established when data for the UE is transmitted between the two nodes. This tunnel will correspond to two addresses (address 1 and address 2) to be used by the two nodes, respectively, to transmit the data for the UE. That is, the data for the UE is to be transmitted from address 1 to address 2 or from address 2 to address 1.

Figure 3:
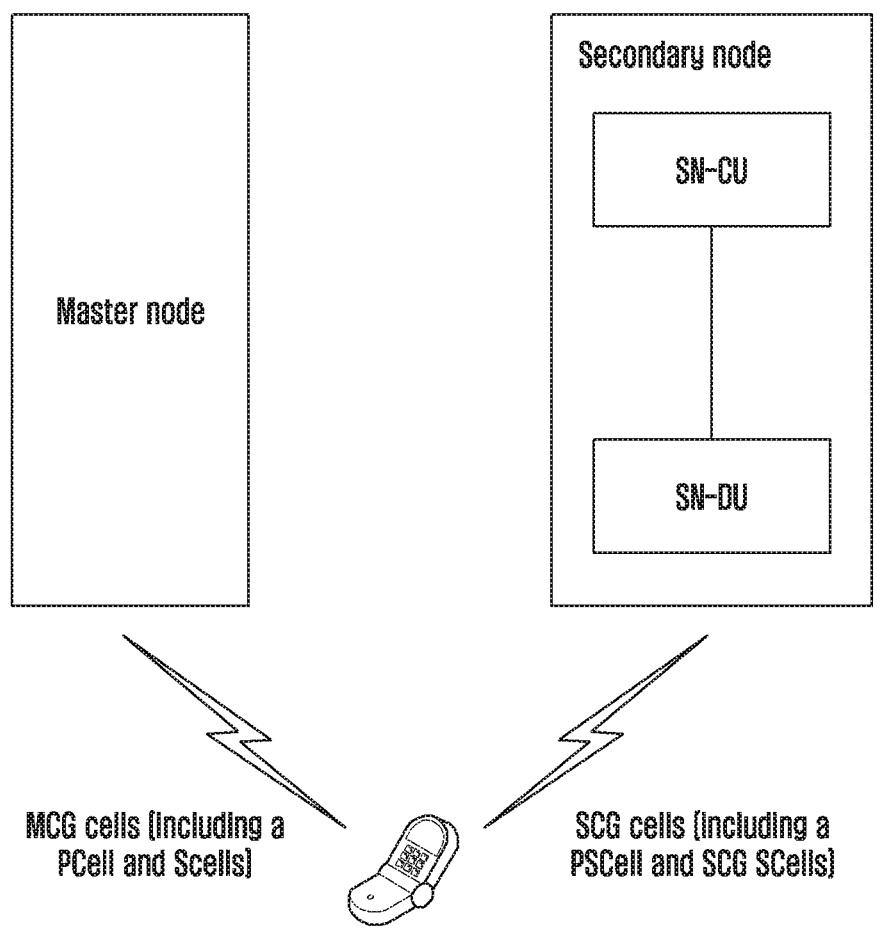
FIG. 3 illustrates a network structure of MR-DC, in which a UE is connected to an SN including a central unit and a distributed unit, in the prior art.

Through combination of the MR-DC with the CU-DU separation technology, the way in which the UE is connected to the network may be as follows: the UE accesses the MN and the SN simultaneously, and the SN includes one CU and at least one DU connected to the CU, as illustrated in FIG. 3. In this scenario, the PSCell which the UE accesses on the SN may change possibly due to poor quality of communication of the UE in the current PSCell, overload of the current PSCell, etc. The change may include, but be not limited to, the following cases:

The PSCell changes from the current PSCell to an SCG SCell which belongs to the same DU and has been allocated to the UE.

The PSCell changes from the current PSCell to a cell which belongs to the same DU and has not been allocated to the UE.

Figure 4:
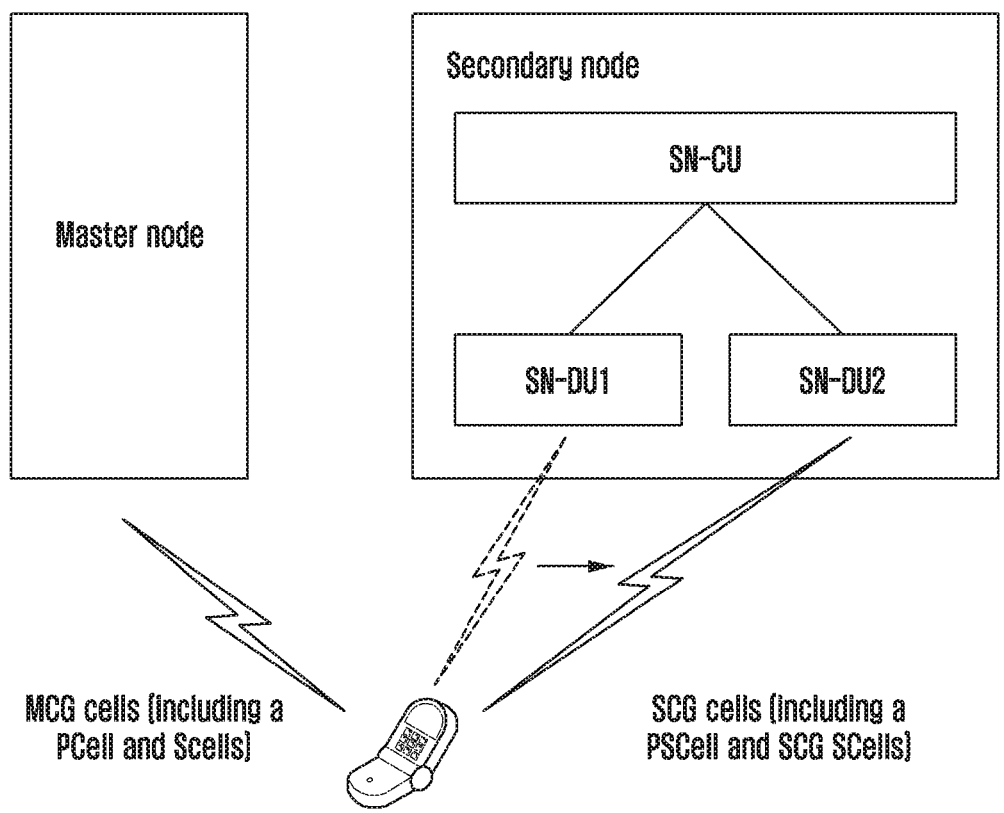
FIG. 4 schematically illustrates change of a distributed unit serving a UE in the prior art.

The PSCell changes from the current PSCell to a cell belonging to another DU (the another DU and the DU in which the current PSCell is located are connected to a same CU, i.e. belonging to a same SN), as illustrated in FIG. 4.

Figure 5:
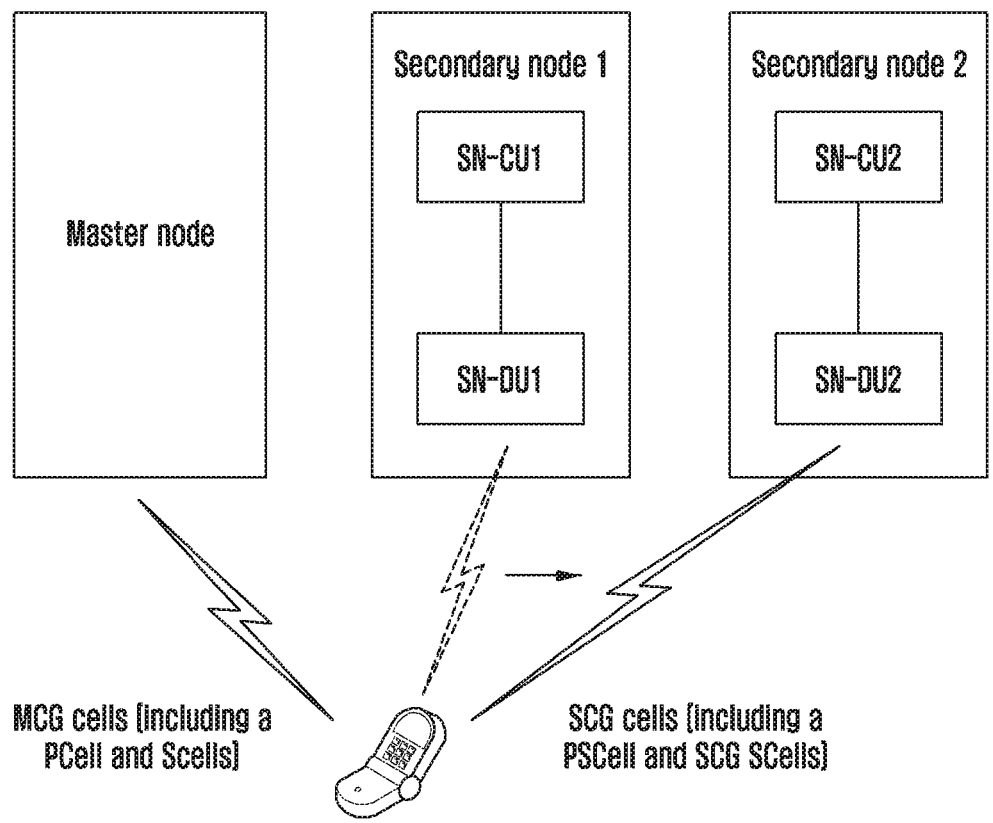
FIG. 5 schematically illustrates change of a secondary node serving a UE in the prior art.

The PSCell changes from the current PSCell to a cell belonging to another DU (the another DU and the DU in which the current PSCell is located are connected to different CUs, respectively, i.e. belonging to different SNs), as illustrated in FIG. 5.

When the PSCell changes as above, the following SN modification flow initiated by an SN will be triggered according to the LTE system (in the flow, messages transceived by the SN are transceived by the CU actually):

Step 1: The SN transmits an SN modification required message to an MN, the message containing SCG Change Indication (the indication indicates PSCell change and, in practice, may also indicate other information) and SCG configuration information (SCG-Config, for example, configuration of cells, serving the UE, on the SN (i.e. an SCG), which may include RLC configuration, MAC layer configuration, etc.).

Steps 2&3: The two steps are optional. When the MN is to provide an address for forwarding data and/or a new SN encryption key, the two steps will be triggered.

Step 4: If configuration for the PSCell change is completed successfully, the MN will reply to the SN with an SN modification confirm message.

For the above flow, TS36.300 v14.2.0 may be referred to.

According to the existing mechanism, it is necessary that the SCG change indication and the SCG-Config are present simultaneously in Step 1. If there is in Step 1 information about releasing a bearer, the SCG change indication is not allowed to be present in Step 1. That is, the existing mechanism doesn't support simultaneous occurrence of the PSCell change and the bearer release.

In the next generation networks or the fifth generation (5G) networks, gNBs providing air interface for UEs can further include gNB central units (gNB-CU) and gNB distributed units (gNB-DU), which are referred to simply as CU and DU hereinafter, to support network function virtualization and improve the efficiency of resource management and scheduling.

A CU at least has protocol layers, such as radio resource control (RRC) and packet data convergence protocol (PDCP), or the like, and may also have service data adaptation protocol (SDAP).

A DU has radio link control (RLC), medium access control, and physical layer, or the like.

Between a CU and a DU, there is a standard public interface referred to as F1 interface.

F1 interface includes: F1 interface control plane (F1-C) and F1 interface user plane (F1-U).

Transmission network layer of F1-C is based on IP transmission. A stream control transmission protocol (SCTP) is added over the IP protocol for more reliable signaling transmission. The protocol for the application layer is FLAP. SCTP can provide reliable transmission of application layer messages.

The transport layer of F1-U is UDP/IP, GTP-U is applied over UDP/IP for transmitting user plane packet data units (PDU).

FIG. 1 illustrates the structure of CU and DU.

In addition, on-demand system information messages are defined in 5G networks in order to reduce system overhead resulted from system information messages. The on-demand system information messages are not broadcasted in cells all the time, but transmitted in response to user requests. To support the on-demand system information messages, a user may send a specific random access preamble (PRACH (Physical Random Access Channel) preamble) or send a preamble on specific random access resource (PRACH resource). A gNB may determine one or multiple system information messages that are requested by the user based on the received random access preamble and/or the resource from which the random access preamble is received. The system information message may include one or multiple system information blocks (SIB). Then the gNB may send the requested system information message to the user via broadcast or multicast or unicast.

As in the above, in 5G systems, gNB may be composed of two independent function entities, i.e., CU and DU, between which the interface is a standard F1. According to such a structure, the CU is for generating system information messages, and DU can receive random access preambles sent by users. If there is no support for on-demand system information messages between the CU and the DU, the CU cannot obtain information about that a user has sent a random access preamble for requesting a system information message. Therefore, a mechanism between CU and DU needs to be defined to support on-demand system information message. At present, there is no discussion regarding the issue.

In the 5G network, when a UE is connected to an MN and an SN simultaneously and the SN includes one CU and at least one DU connected to the CU, change of a PSCell may cause release of a UE bearer. For example, due to movement of the UE, it is necessary to change the PSCell for the UE, for example, from a DU (DU1) to another DU (DU2) connected to the same CU. One PSCell and multiple SCG SCells are currently allocated to the UE on the DU1. However, there is only one suitable cell on the DU2. Therefore, only one PSCell may be allocated to the UE on the DU2. In other words, in this process, the cell serving the UE changes from multiple cells on the DU1 to one cell on the DU2. Thus, some bearers serving the UE through the SN may have to be released. This is the scenario in which change of the PSCell and release of a bearer occur simultaneously. However, the existing mechanism doesn't support simultaneous occurrence of change of the PSCell and release of a bearer. In addition, in order to support such a scenario, it is also necessary to perform processes for setup and modification of UE context between the CU and the DU. During these processes, it is necessary to consider operations of setup and modification of the context of a serving cell for the UE, which are not involved in the existing discussion.

Meanwhile a UE (i.e., terminal) of the disclosure may comprises a transceiver configured to transmit and receive a signal with at least one network node or base station (including eNB or gNB) and a controller coupled with the transceiver and configured to control an operation of the UE. According to an embodiment, the controller may be implemented as at least one processor included in the UE.

In addition, in the 5G network, a UE may be connected to an MN and an SN simultaneously and the SN may include one CU and at least one DU connected to the CU. In this scenario, a PSCell for the UE may change while a UE bearer on the SN may be released. To support this case, embodiments of the disclosure provide flows of signaling interaction between the MN and the SN and flows of UE context setup and modification between the CU and the DU, as follows.

Figure 6:
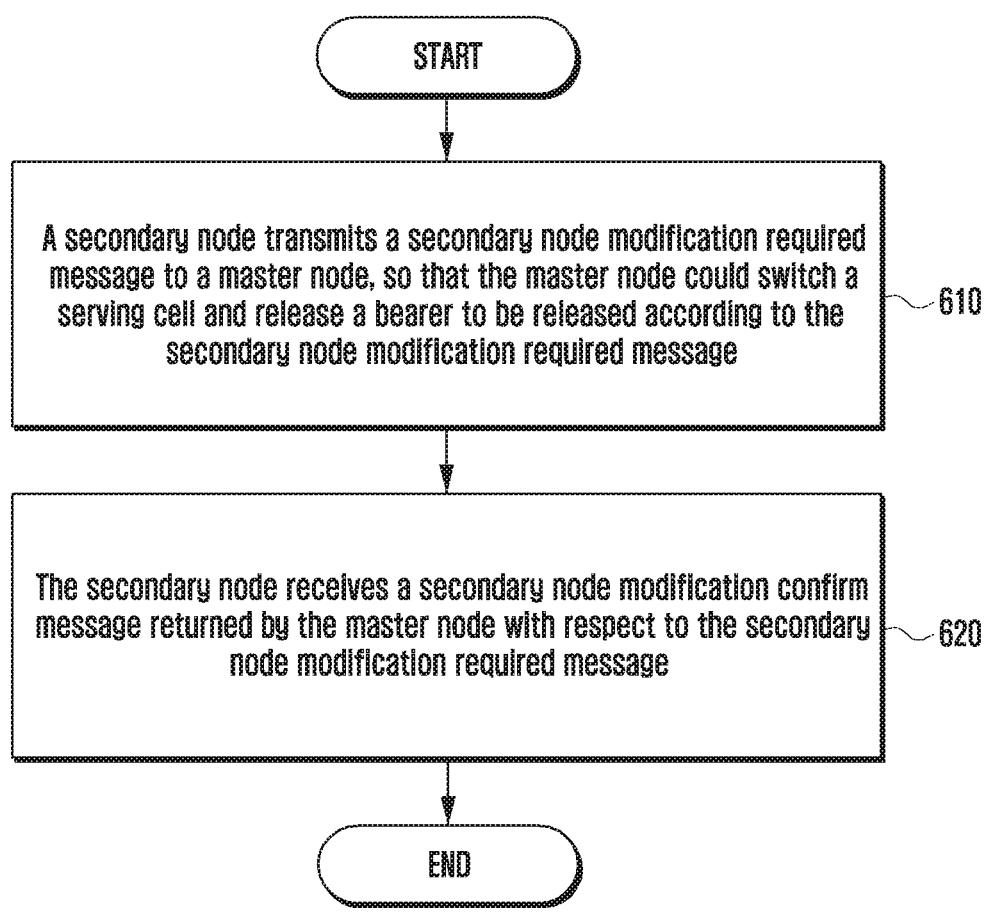
FIG. 6 is a flowchart of a method for switching a serving cell according to a first embodiment of the disclosure.

In order to overcome the defect of the prior art that it is unallowable to release a bearer to be released while switching a serving cell, the first embodiment of the disclosure provides a method for switching a serving cell, as illustrated in FIG. 6. In Step 610, a secondary node transmits a secondary node modification required message to a master node, so that the master node could switch a serving cell and release a bearer to be released according to the secondary node modification required message. In Step 620, the secondary node receives a secondary node modification confirm message returned by the master node with respect to the secondary node modification required message.

Preferably, the secondary node modification required message comprises at least one of information of a bearer to be released, Secondary Cell Group (SCG) change indication, first indication, second indication, third indication, SCG configuration information (SCG-Config), and information of an unreleased bearer.

Preferably, the information of a bearer to be released and the information of an unreleased bearer comprise at least one of identification information of a bearer, Quality of Service (QoS) parameters of a bearer, bearer type information, address information of a tunnel which delivers data of a bearer between two nodes, an uplink forwarding address of a bearer, and a downlink forwarding address of a bearer. The SCG change indication is for indicating change of a Primary SCell (PScell) of the SCG. The SCG-Config is related configuration information about the SCG configured for a UE, which is generated by the secondary node. The first indication is for indicating that the master node triggers transmission of a secondary node modification request message to the secondary node. The second indication is for indicating that the master node prohibits transmitting the SCG-Config to the UE. The third indication is for indicating that the secondary node prohibits updating the SCG-Config. The information of an unreleased bearer comprises information of each unreleased bearer and/or information of an unreleased Master Cell Group (MCG) split bearer. The information of the unreleased MCG split bearer comprises an identification of the bearer and address information of a tunnel, which delivers data of the bearer, on the secondary node side.

Preferably, the method further comprises: after the step of the secondary node transmitting a secondary node modification required message to the master node, the secondary node transmitting the SCG-Config to the UE.

Preferably, the method further comprises: before the step of the secondary node receiving a secondary node modification confirm message returned by the master node with respect to the secondary node modification required message, the secondary node receiving a secondary node modification request message transmitted by the master node and transmitting, to the master node, a secondary node modification request acknowledge message with respect to the secondary node modification request message.

Preferably, the secondary node modification request message comprises at least one of information of a new bearer, information of a bearer to be modified, information of a bearer to be released, encryption key information for the secondary node, SCG change indication, and information for configuring the SCG which is generated by the master node to request the UE to set up or modify or release the SCG. The secondary node modification request acknowledge message comprises at least one of information of an accepted new bearer, information of an accepted bearer to be modified; information of an accepted bearer to be released, SCG-Config and information of an unreleased MCG split bearer.

Preferably, the method further comprises: before the step of the secondary node transmitting a secondary node modification required message to the master node, the secondary node performing corresponding UE context setup or corresponding UE context modification.

Preferably, the secondary node comprises one Central Unit (CU) and at least one Distributed Unit (DU) connected to the CU, and the step of the secondary node performing corresponding UE context setup comprises: transmitting, through the CU, a UE context setup request message to the DU; and receiving, through the CU, a UE context setup response message returned by the DU with respect to the UE context setup request message.

Preferably, the UE context setup request message comprises at least one of cell list information, information of a new cell transmitted by the CU, context information related to a UE bearer and/or identification, and information about a reason for the UE context setup. The UE context setup response message comprises at least one of identification information of a refused cell, context information related to a UE bearer and/or identification, information about a reason for returning the UE context setup response message by the DU, and information of a new cell transmitted by the DU. The cell list information comprises at least one of cell identification and measurement of a cell. The information of a new cell transmitted by the CU comprises information of a new cell determined by the CU or information of a candidate new cell determined by the CU. The information of a new cell determined by the CU comprises at least one of cell list information, identification information of one or more PCells, identification information of one or more SCells, identification information of one or more PSCells, identification information of one or more SCG SCells, and measurement information of a cell. The information of a candidate new cell determined by the CU comprises at least one of candidate cell list information, identification information of one or more candidate PCells, identification information of one or more candidate SCells, identification information of one or more candidate PSCells, identification information of one or more candidate SCG SCells, and measurement information of a candidate new cell. The information of a new cell transmitted by the DU comprises at least one of identification of a selected PCell, identification of one or more selected SCells, identification of a selected PSCell, and identification of one or more selected SCG SCells. The context information related to a UE bearer and/or identification comprises at least one of information of a bearer for a UE and identification information of a UE. The information about a reason for the UE context setup and the information about a reason for returning a UE context setup response message by the DU comprise at least one of cell overload, cell uplink overload, cell downlink overload, cell uplink control channel overload, load balancing, poor signal quality or strength of a UE in a cell, and poor uplink/downlink signal quality or strength of a UE in a cell. The information about a reason for the UE context setup and the DU returning a UE context setup response message are for each cell or for all cells.

Preferably, the secondary node comprises one Central Unit (CU) and at least one Distributed Unit (DU) connected to the CU, and the step of the secondary node performing corresponding UE context modification comprises: transmitting, through the CU, a UE context modification request message to the DU; and receiving, through the CU, a UE context modification response message returned by the DU with respect to the UE context modification request message.

Preferably, the secondary node comprises one Central Unit (CU) and at least one Distributed Unit (DU) connected to the CU, and the step of the secondary node performing corresponding UE context modification comprises: transmitting, through the DU, a UE context modification required message to the CU; and receiving, through the DU, a UE context modification confirm message returned by the CU with respect to the UE context modification required message.

Preferably, the secondary node comprises one Central Unit (CU) and at least one Distributed Unit (DU) connected to the CU, and the step of the secondary node performing corresponding UE context modification comprises: transmitting, through the DU, a UE context modification required message to the CU; transmitting, through the CU, a UE context modification request message to the DU; and receiving, through the CU, a UE context modification response message returned by the DU with respect to the UE context modification request message.

Preferably, the method further comprises: after the step of receiving, through the CU, a UE context modification response message returned by the DU with respect to the UE context modification request message, receiving through the DU a UE context modification confirm message returned by the CU.

The first embodiment of the disclosure provides a method for switching a serving cell. Compared with the prior art, a secondary node transmits a secondary node modification required message to a master node, so that the master node could switch a serving cell and release a bearer to be released according to the secondary node modification required message, which provides prerequisite guarantee for subsequently releasing a UE bearer on the secondary node while switching a serving cell according to the secondary node modification required message. The secondary node receives a secondary node modification confirm message returned by the master node with respect to the secondary node modification required message, so that, if there is a bearer to be released when a serving cell is switched, the serving cell could be switched and the bearer to be released on the secondary node could be released according to the secondary node modification required message, which greatly improves signaling transmission efficiency and saves signaling resources.

Figure 7:
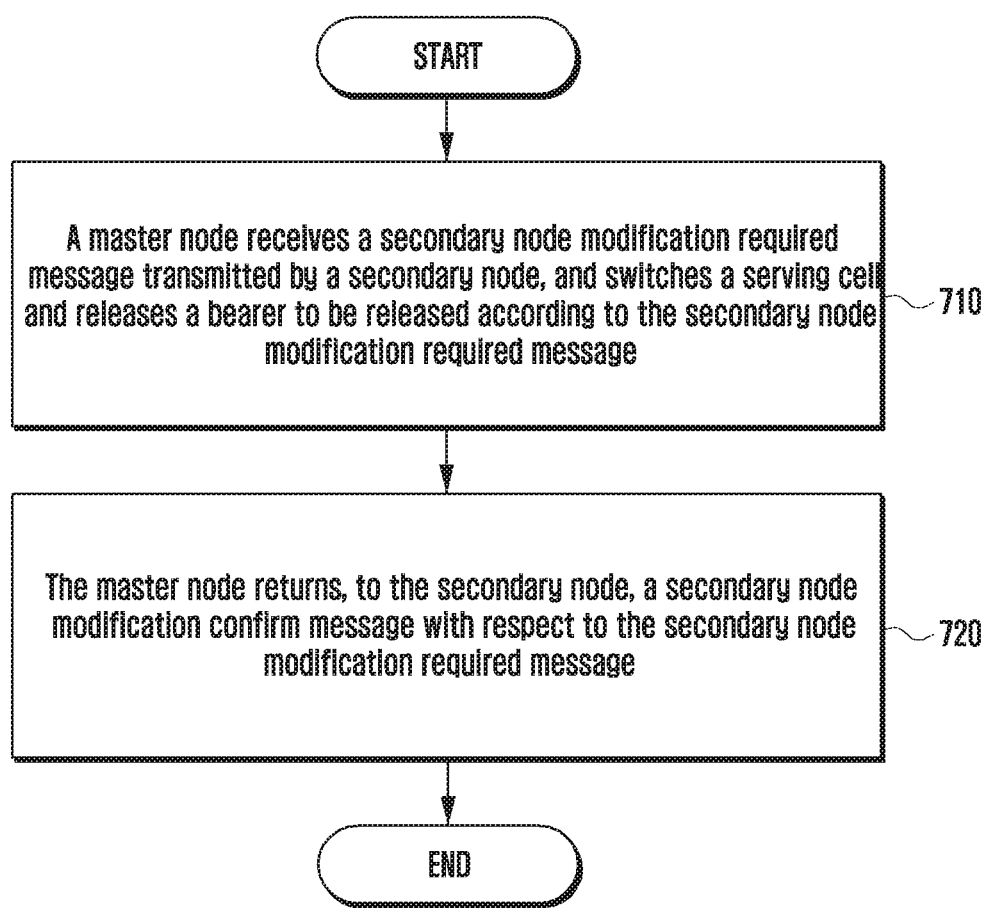
FIG. 7 is a flowchart of a method for switching a serving cell according to a second embodiment of the disclosure.

In addition, in order to overcome the defect of the prior art that it is unallowable to release a bearer to be released while switching a serving cell, the second embodiment of the disclosure further provides a method for switching a serving cell, as illustrated in FIG. 7. In Step 710, a master node receives a secondary node modification required message transmitted by a secondary node, and switches a serving cell and releases a bearer to be released according to the secondary node modification required message. In Step 720, the master node returns, to the secondary node, a secondary node modification confirm message with respect to the secondary node modification required message.

The second embodiment of the disclosure provides a method for switching a serving cell, so that, if there is a bearer to be released when a serving cell is switched, a master node could switch a serving cell and release a bearer to be released on an SN according to the received secondary node modification required message, which greatly improves signaling transmission efficiency and saves signaling resources.

The embodiments of the disclosure according to various situations will be described below in detail.

A problem to be mainly solved by embodiments of the disclosure is that, when a UE is connected to an MN and an SN simultaneously, a PSCell for the UE may change while some bearers for the UE served by the SN need to be released. The PSCell is a Primary SCell (PSCell) hereinafter. Change of the PSCell may occur within a same DU or between different DUs. If change of the PSCell occurs between different DUs, an address of a tunnel used to deliver data of an MCG split bearer (a tunnel between the MN and the DU) may change. Names of signaling in the signaling flows below are only exemplary and other names may be adopted. Some general information which may be used in the following description will be described uniformly as follows:

Information of a bearer: the bearer may be a new bearer, a bearer to be modified, a bearer to be released, an accepted new bearer, an accepted bearer to be modified, an accepted bearer to be released, a refused new bearer, a refused bearer to be modified, or a refused bearer to be released; the information of a bearer comprises one or more of:

Identification information of a bearer;
QoS parameters of a bearer, for example, a QoS Class identifier, a 5G QoS Indicator, an Allocation and Retention Priority, a Non-standardized QoS Flow descriptor, etc. (see Specification TS36.423 and Specification TS38.423);
bearer type information, for example, an MCG bearer, an MCG split bearer, an SCG bearer or an SCG split bearer;
address information of a tunnel used to deliver data of a bearer between two nodes, for example, a GTP tunnel endpoint (see Specification TS36.423), including a transport layer address (see Specification TS36.424 and TS36.414) and/or a GTP tunnel endpoint identifier (see Specification TS29.281), wherein the two nodes may be an MN and an SN, central units of the MN and the SN, distributed units of the MN and the SN, or a central unit and a distributed unit, respectively, and the address information is address information of a node on one side, for example, an MN, an SN, a central unit of the SN, a distributed unit of the SN, a central unit of a base station, a distributed unit of a base station, etc.;
an uplink forwarding address (UL forwarding GTP Tunnel Endpoint), for example, an address of a node side transmitting the information of a bearer; and
a downlink forwarding address (DL forwarding GTP Tunnel Endpoint), for example, an address of a node side transmitting the information of a bearer, SCG change indication: the indication may indicate PSCell change and may also indicate other content, for example, PDCPCountWrapAround etc., SCG configuration information (SCG-Config): the configuration information is related configuration information, generated by an SN, about an SCG configured for a UE, for example, configuration of a PSCell, configuration of an SCG SCell, RLC configuration, MAC layer configuration, etc., Information for configuring an SCG (SCG-ConfigInfo): the information is generated by an MN to request a UE to set up, modify or release the SCG, and the MN may also provide, in the information, some auxiliary information for assisting an SN in generating the SCG-Config.

To simplify literal description below, unless otherwise specified, the information of a bearer, the SCG change indication and the SCG-Config are used to represent detailed content of the information.

Figure 8:
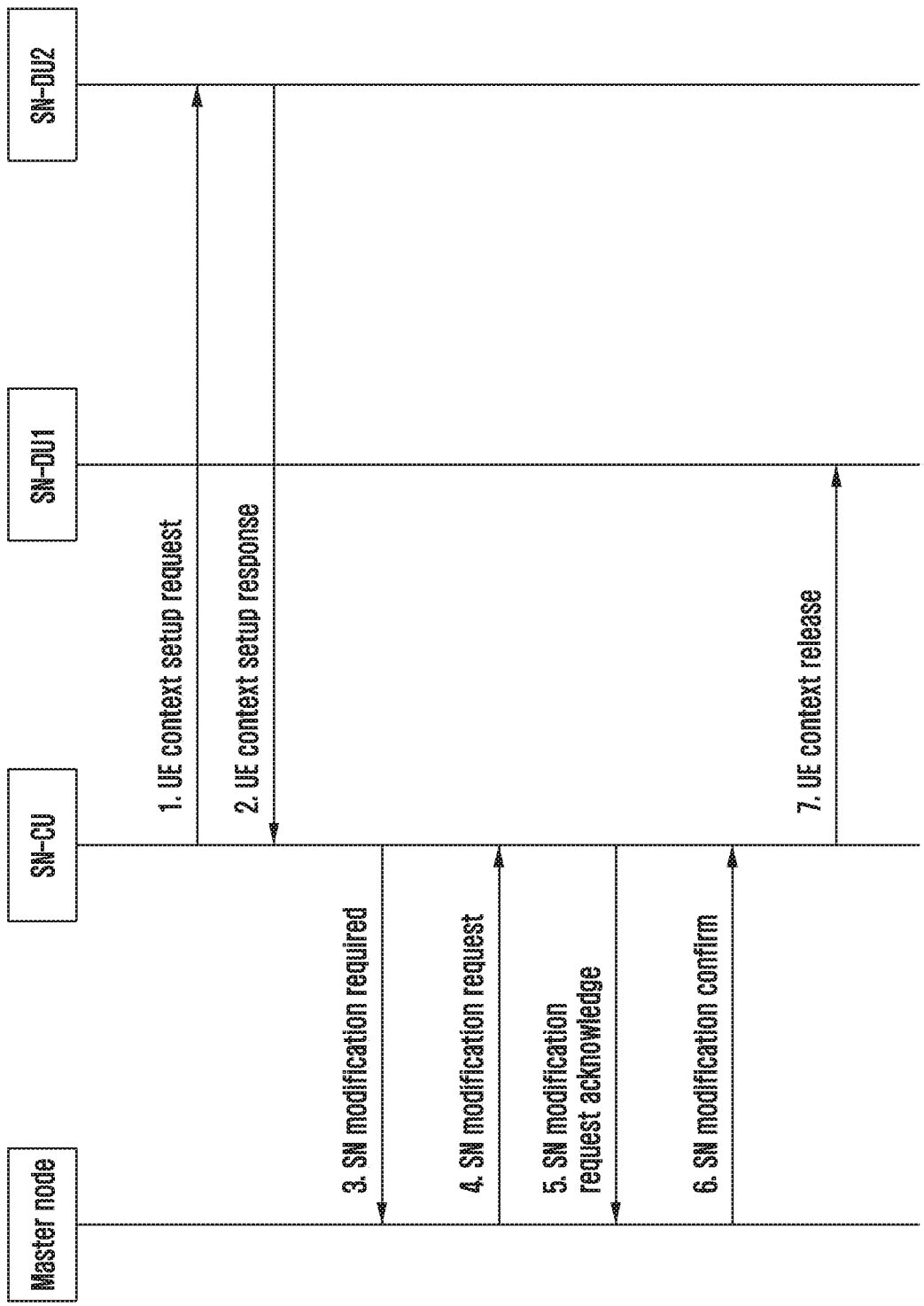
FIG. 8 illustrates a signaling flow of changing a distributed unit serving a UE through a UE context setup flow according to an embodiment of the disclosure.
Figure 9:
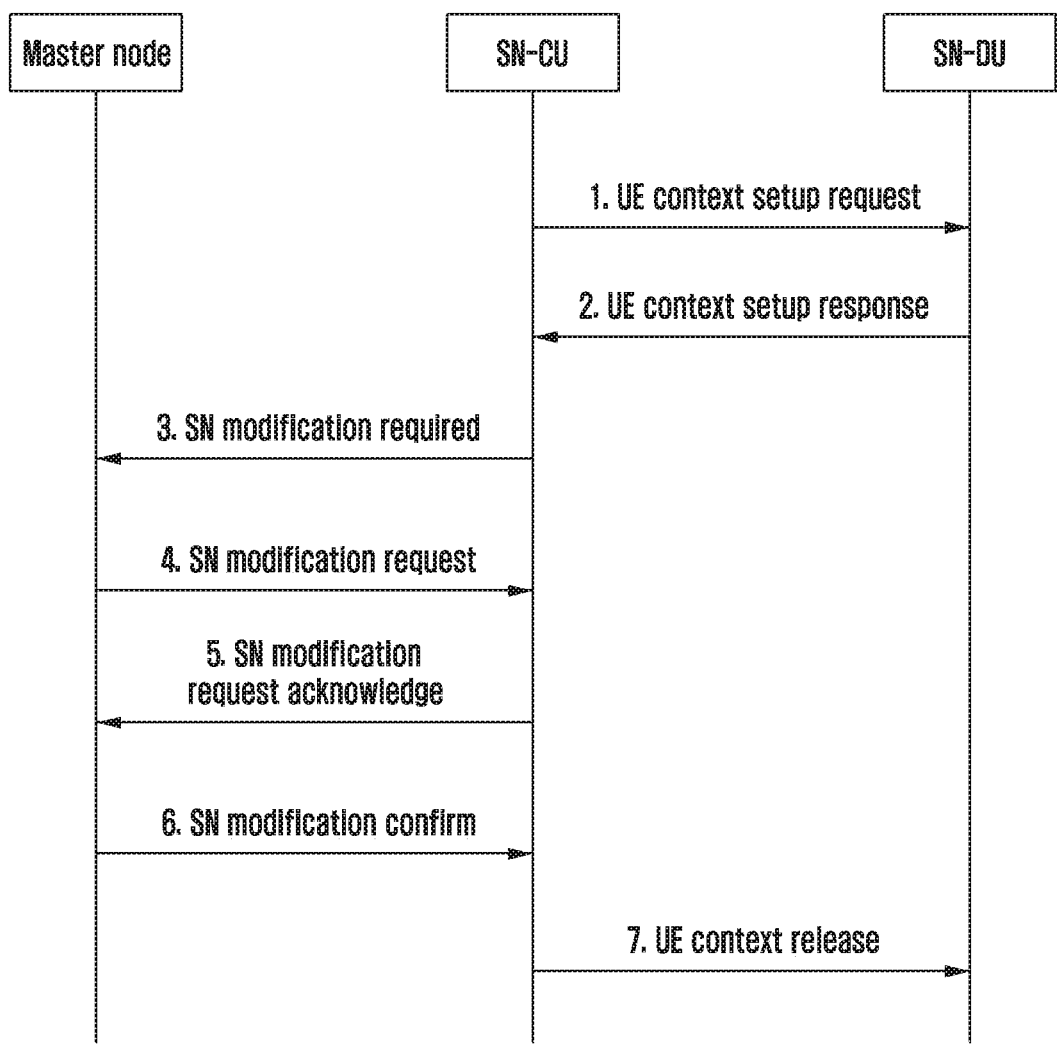
FIG. 9 illustrates a signaling flow of changing configuration of a distributed unit serving a UE, on a same secondary node, through a UE context setup flow according to an embodiment of the disclosure.
Figure 10:
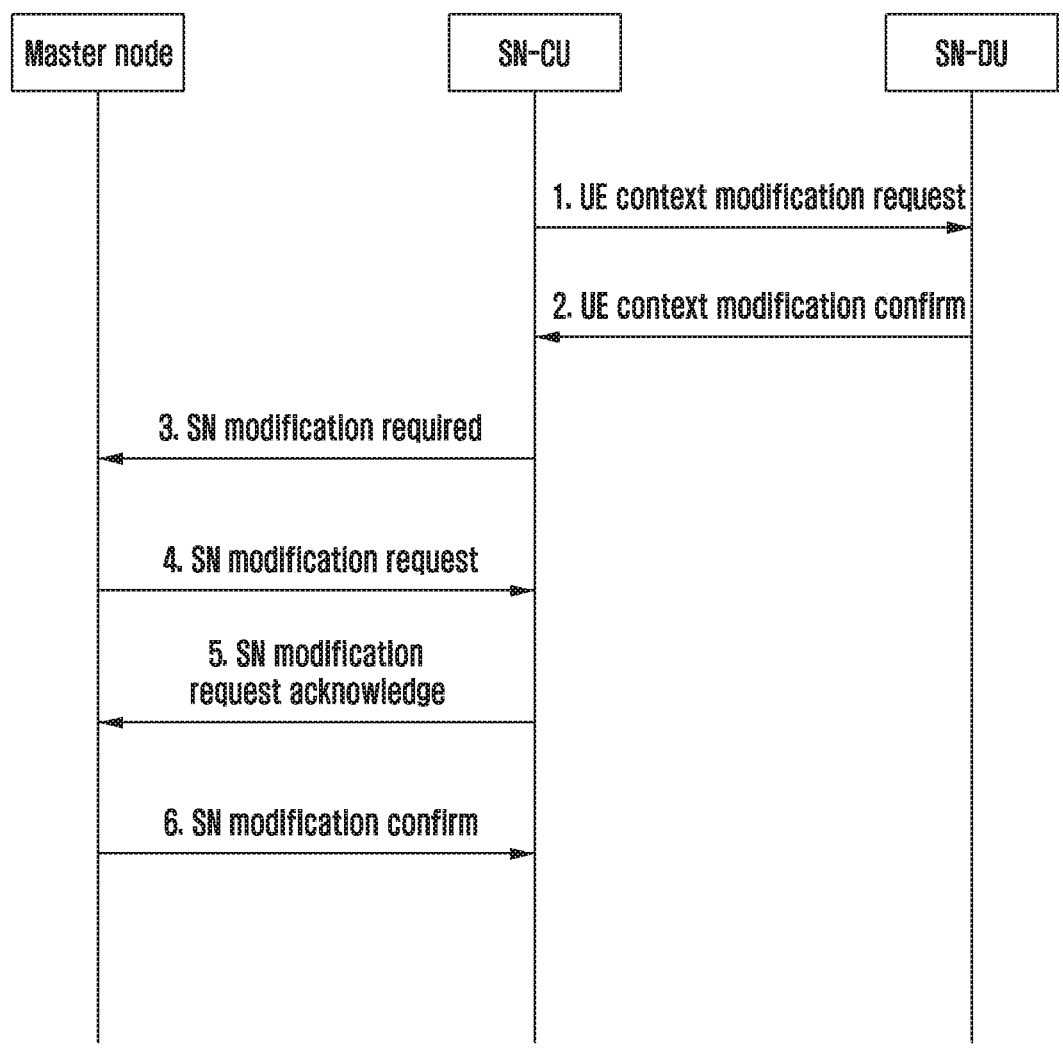
FIG. 10 illustrates a first signaling flow of modifying a PSCell on a distributed unit of a secondary node for a UE according to an embodiment of the disclosure.
Figure 11:
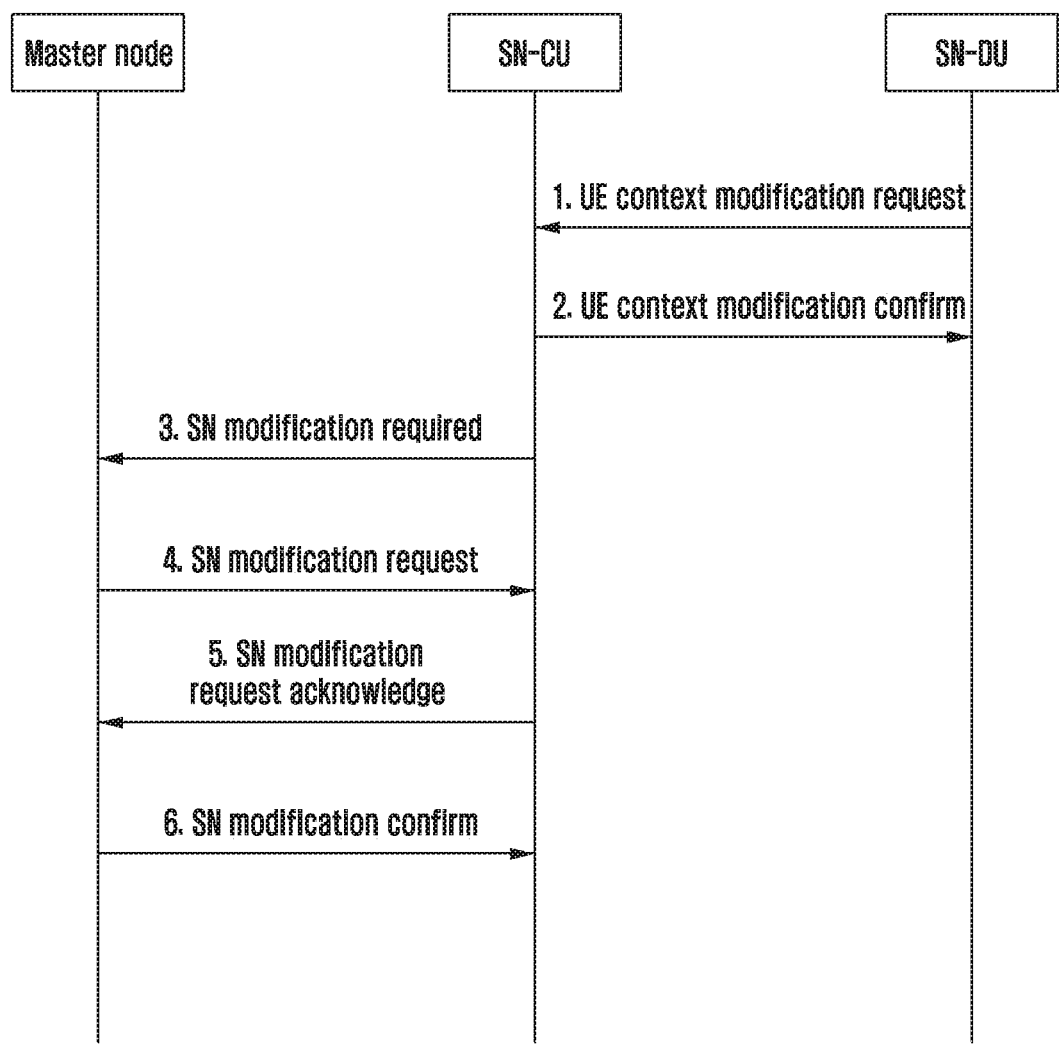
FIG. 11 illustrates a second signaling flow of modifying a PSCell on a distributed unit of a secondary node for a UE according to an embodiment of the disclosure.
Figure 12:
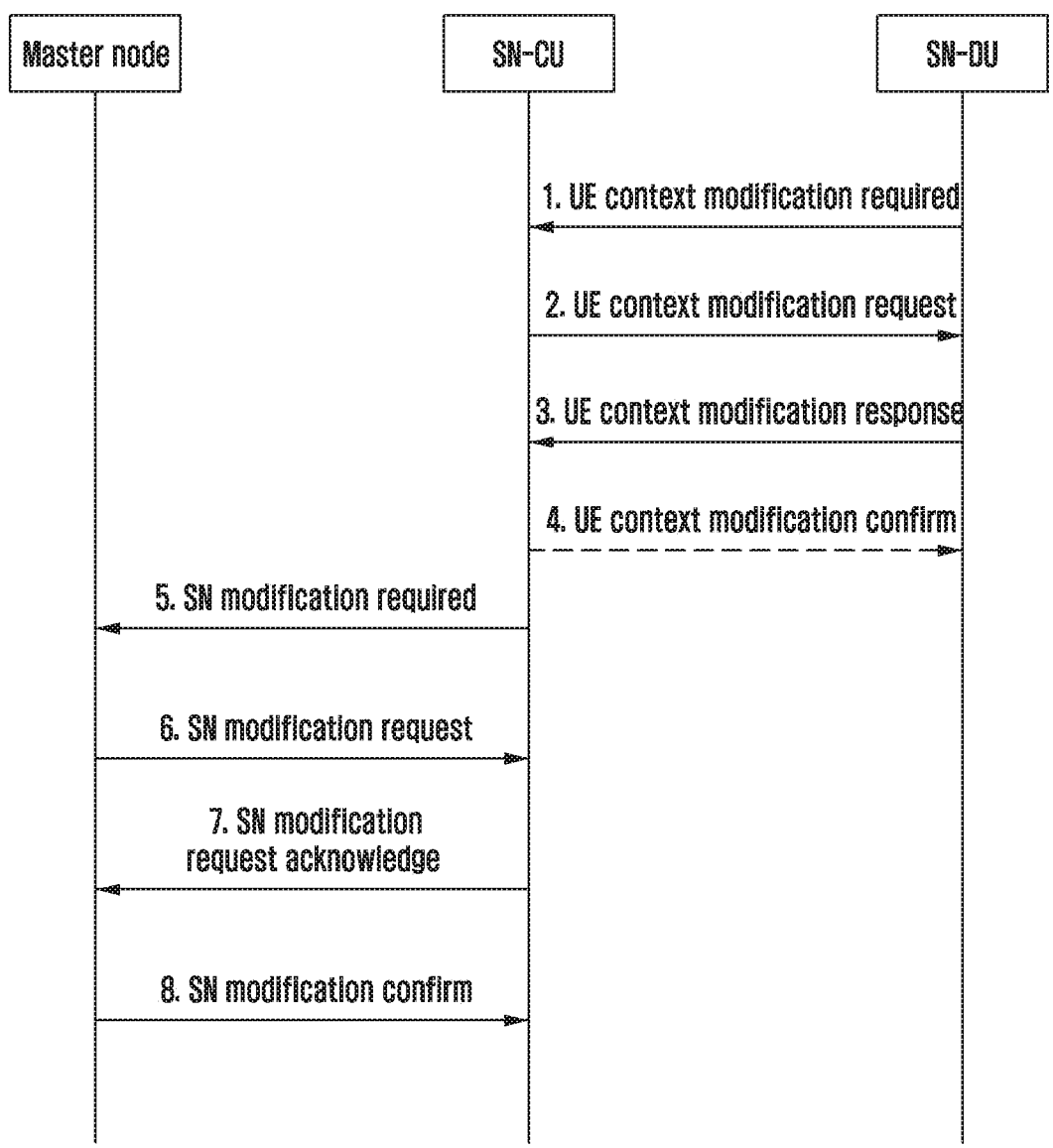
FIG. 12 illustrates a third signaling flow of modifying a PSCell on a distributed unit of a secondary node for a UE according to an embodiment of the disclosure.

First, examples of related signaling flows are given:

1) According to an embodiment of the disclosure, a PSCell and a new PSCell belong to different DUs (UE context setup flow triggered by a CU), as illustrated in FIG. 8;

2) According to an embodiment of the disclosure, a PSCell and a new PSCell belong to a same DU (UE context setup flow triggered by a CU), as illustrated in FIG. 9;

3) According to an embodiment of the disclosure, a PSCell and a new PSCell belong to a same DU (UE context modification flow triggered by a CU), as illustrated in FIG. 10;

4) According to an embodiment of the disclosure, a PSCell and a new PSCell belong to a same DU (UE context modification flow triggered by a DU), as illustrated in FIG. 11;

5) FIG. 12 illustrates a signaling flow of modifying a PSCell on a distributed unit of a secondary node for a UE according to an embodiment of the disclosure.

The signaling flows may be divided into two parts: A) a signaling flow between an MN and an SN (or a central unit in the SN); B) signaling flows between a central unit and a distributed unit in an SN. The two parts will be described below, respectively.

A. A Signaling Flow Between an MN and an SN

Figure 13:
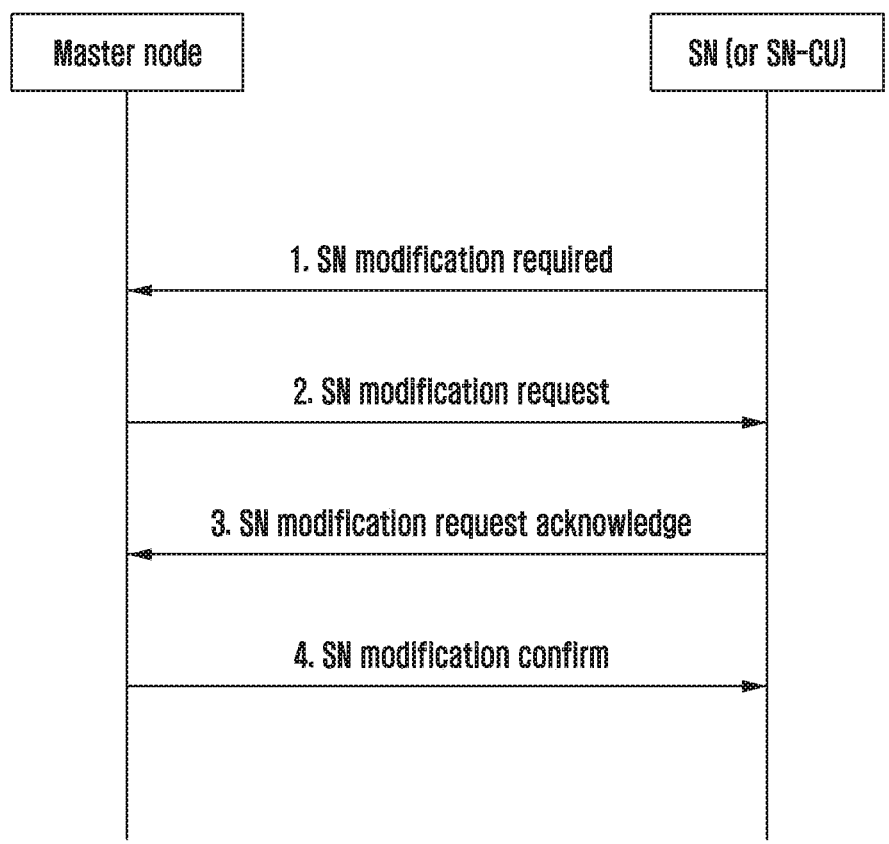
FIG. 13 illustrates a signaling flow of modification of a secondary node triggered by the secondary node according to an embodiment of the disclosure.

FIG. 13 illustrates a signaling flow between an MN and an SN in FIGS. 8 to 12. The signaling flow between an MN and an SN, as introduced below, may be applied to signaling flows illustrated in FIG. 8 to FIG. 12 and also to other cases, for example, a case in which secondary node modification is triggered by a secondary node.

Step 1: A secondary node (or an SN-CU) transmits an SN modification required message to a master node. The message contains one or more of:
information of a bearer to be released;
SCG change indication which indicates change of a PSCell; if such indication is included in SN modification required message, it means that the step 1 is triggered in order to change PSCell at the SN side. Furthermore, "SCG change indication" is not the only possible name for such indication, as long as an indication included in SN modification required message can indicate to MN that such SN modification required message is triggered to change PSCell at the SN side. For example, it can be "PDCP change indication" since the PSCell change can cause the PDCP change. In addition, in case SN includes SN-CU and SN-DU, the PSCell change can be implemented at SN side first between SN-CU and SN-DU (the detailed procedure is shown in FIG. 8~FIG. 12, and the detailed description can be found below in this invention)
a new indication that the master node needs to trigger Step 2;
an indication that it is unnecessary to transmit SCG-Config to a UE;
an indication that it is unnecessary to update SCG-Config;
SCG-Config; and
information of an unreleased bearer, which may be related to each unreleased bearer or may be related to a part of unreleased bearers (for example, an unreleased MCG split bearer), wherein, if a UE is connected to an MN and an SN (or an SN-DU) simultaneously, address information refers to address information on the SN side or the SN-CU side or the SN-DU side.

Step 2: The master node transmits an SN modification request message to the secondary node (or the SN-CU). The message contains one or more of:
information of a new bearer;
information of a bearer to be modified;
information of a bearer to be released;
encryption key information for the secondary node;
SCG change indication; and
Information for configuring an SCG (SCG-ConfigInfo).

Step 3: The secondary node (or the SN-CU) transmits an SN modification request acknowledge message to the master node. The message contains one or more of:
information of an accepted new bearer;
information of an accepted bearer to be modified;
information of an accepted bearer to be released;
SCG-Config; and
an indication that it is unnecessary to transmit SCG-Config to a UE.

Step 4: The master node transmits an SN modification confirm message to the secondary node (or the SN-CU). The message may contain information for configuring an SCG (SCG-ConfigInfo).

It should be noted that, among these steps, Step 2 and Step 3 are optional. A condition for triggering Step 2 may be any one of:
an indication for triggering Step 2 is contained in Step 1; and
the following information is contained in Step 1:
information of a bearer to be released, and
one or more of:
SCG change indication which indicates change of a PSCell;
SCG-Config; and
information of an unreleased bearer, which may be related to each unreleased bearer or may be related to a part of unreleased bearers (for example, an unreleased MCG split bearer), wherein, if a UE is connected to an MN and an SN (or an SN-DU) simultaneously, address information refers to address information on the SN side or the SN-CU side or the SN-DU side.

The above flow may have several detailed embodiments (possible triggering conditions for these detailed embodiments are as follows: an SN determines that change of a PSCell for a UE occurs within a same distributed unit or within different distributed units and there is a bearer to be released; other triggering conditions are not excluded).

Each detailed embodiment will be specifically introduced below.

A specific process of detailed Embodiment 1 (which includes two steps, i.e. Step 1 and Step 4, and in which an MN transmits SCG-Config to a UE) is illustrated below.

Step 1: A secondary node (or an SN-CU) transmits an SN modification required message to a master node. The message contains the following information:
information of a bearer to be released;
optionally, SCG change indication which indicates change of a PSCell; if such indication is included in SN modification required message, it means that the step 1 is triggered in order to change PSCell at the SN side. Furthermore, "SCG change indication" is not the only possible name for such indication, as long as an indication included in SN modification required message can indicate to MN that such SN modification required message is triggered to change PSCell at the SN side. For example, it can be "PDCP change indication" since the PSCell change can cause the PDCP change. In addition, in case SN includes SN-CU and SN-DU, the PSCell change can be implemented at SN side first between SN-CU and SN-DU (the detailed procedure is shown in FIG. 8~FIG. 12, and the detailed description can be found below in this invention)
SCG-Config; and
optionally, information of an unreleased MCG split bearer, including at least the following information:
identification of a bearer; and
address information of a tunnel used to deliver data of a bearer on the SN side or the SN-DU side.

Among the above information, the SCG change indication is optional. Change of a PSCell for a UE may be implicitly indicated by containing information of an unreleased MCG split bearer and/or the SCG-Config in Step 1.

Step 2/3: The two steps are omitted.

Step 4: The master node transmits an SN modification confirm message to the secondary node (or the SN-CU).

Then, the master node transmits the SCG-Config received in Step 1 to the UE, which may follow Step 1.

A specific process of detailed Embodiment 2 (which includes two steps, i.e. Step 1 and Step 4, and in which an SN transmits SCG-Config to a UE) is illustrated below.

Step 1: A secondary node (or an SN-CU) transmits an SN modification required message to a master node. The message contains the following information:
information of a bearer to be released;
optionally, SCG change indication which indicates change of a PSCell; if such indication is included in SN modification required message, it means that the step 1 is triggered in order to change PSCell at the SN side. Furthermore, "SCG change indication" is not the only possible name for such indication, as long as an indication included in SN modification required message can indicate to MN that such SN modification required message is triggered to change PSCell at the SN side.

For example, it can be "PDCP change indication" since the PSCell change can cause the PDCP change. In addition, in case SN includes SN-CU and SN-DU, the PSCell change can be implemented at SN side first between SN-CU and SN-DU (the detailed procedure is shown in FIG. 8~FIG. 12, and the detailed description can be found below in this invention)

optionally, information of an unreleased MCG split bearer, including at least the following information:

identification of a bearer; and address information of a tunnel used to deliver data of a bearer on the SN side or the SN-DU side.

Among the above information, the SCG change indication is optional. Change of a PSCell for a UE may be implicitly indicated by containing information of an unreleased MCG split bearer in Step 1.

Step 2/3: The two steps are omitted.

Step 4: The master node transmits an SN modification confirm message to the secondary node (or the SN-CU).

In this process, the secondary node generates SCG-Config before Step 1 or between Step 1 and Step 4, and transmits it to the UE after Step 1.

A specific process of detailed Embodiment 3 (which includes four steps, i.e. Step 1 to Step 4, and in which there is no SCG-Config in Step 1) is illustrated below.

Step 1: A secondary node (or an SN-CU) transmits an SN modification required message to a master node. The message contains the following information:

information of a bearer to be released;

optionally, SCG change indication which indicates change of a PSCell, or optionally, a new indication that the master node needs to trigger Step 2; if such indication is included in SN modification required message, it means that the step 1 is triggered in order to change PSCell at the SN side. Furthermore, "SCG change indication" is not the only possible name for such indication, as long as an indication included in SN modification required message can indicate to MN that such SN modification required message is triggered to change PSCell at the SN side. For example, it can be "PDCP change indication" since the PSCell change can cause the PDCP change. In addition, in case SN includes SN-CU and SN-DU, the PSCell change can be implemented at SN side first between SN-CU and SN-DU (the detailed procedure is shown in FIG. 8~FIG. 12, and the detailed description can be found below in this invention)

optionally, information of an unreleased MCG split bearer, including at least the following information:

identification of a bearer; and address information of a tunnel used to deliver data of a bearer on the SN side or the SN-DU side.

Among the above information, the SCG change indication is optional. Change of a PSCell for a UE or that the master node needs to trigger Step 2 may be implicitly indicated by containing information of an unreleased MCG split bearer in Step 1.

Step 2: The master node transmits an SN modification request message to the secondary node (or the SN-CU). The message contains one or more of:

information of a new bearer;

information of a bearer to be modified, which may include information of a bearer obtained after the bearer to be released in Step 1 is modified in bearer type;

information of a bearer to be released;

encryption key information for the secondary node;

SCG change indication; and information for configuring an SCG (SCG-ConfigInfo).

Step 3: The secondary node (or the SN-CU) transmits an SN modification request acknowledge message to the master node. The message contains one or more of:

SCG-Config; and optionally, information of an unreleased MCG split bearer, including at least the following information:

identification of a bearer; and address information of a tunnel used to deliver data of a bearer on the SN side or the SN-DU side.

Step 4: The master node transmits an SN modification confirm message to the secondary node (or the SN-CU).

In the steps, the SCG-Config may be transmitted to the UE by the secondary node, and may also be transmitted to the UE by the master node. If the SCG-Config is transmitted by the secondary node: in one implementation, after Step 1, the secondary node transmits the SCG-Config (for example, the SCG-Config generated after Step 2) to the UE, so that it is unnecessary to contain the SCG-Config in Step 3; in another implementation, the SCG-Config is contained in Step 3, but the SCG-Config is transmitted by the secondary node, and the secondary node adds, to the SN modification required message in Step 1 or the SN modification request acknowledge message in Step 3, an indication that the master node doesn't need to transmit the SCG-Config. If the SCG-Config is transmitted by the master node, in one implementation, the SCG-Config is contained in Step 3, and the master node transmits the SCG-Config received in Step 3.

A specific process of detailed Embodiment 4 (which includes four steps, i.e. Step 1 to Step 4, and in which there is SCG-Config in Step 1 and the SCG-Config is updated in Step 3) is illustrated below.

Step 1: A secondary node (or an SN-CU) transmits an SN modification required message to a master node. The message contains the following information:

information of a bearer to be released;

optionally, SCG change indication which indicates change of a PSCell, or optionally, a new indication that the master node needs to trigger Step 2; if such indication is included in SN modification required message, it means that the step 1 is triggered in order to change PSCell at the SN side. Furthermore, "SCG change indication" is not the only possible name for such indication, as long as an indication included in SN modification required message can indicate to MN that such SN modification required message is triggered to change PSCell at the SN side. For example, it can be "PDCP change indication" since the PSCell change can cause the PDCP change. In addition, in case SN includes SN-CU and SN-DU, the PSCell change can be implemented at SN side first between SN-CU and SN-DU (the detailed procedure is shown in FIG. 8~FIG. 12, and the detailed description can be found below in this invention)

SCG-Config; and optionally, information of an unreleased MCG split bearer, including at least the following information:

identification of a bearer; and address information of a tunnel used to deliver data of a bearer on the SN side or the SN-DU side.

Among the above information, the SCG change indication is optional. Change of a PSCell for a UE or that the master node needs to trigger Step 2 may be implicitly indicated by containing information of an unreleased MCG split bearer and/or the SCG-Config in Step 1.

Step 2: The master node transmits an SN modification request message to the secondary node (or the SN-CU). The message contains one or more of:
  information of a new bearer;
  information of a bearer to be modified, which may include information of a bearer obtained after the bearer to be released in Step 1 is modified in bearer type;
  information of a bearer to be released;
  encryption key information for the secondary node;
  SCG change indication; and
  information for configuring an SCG (SCG-ConfigInfo).

Step 3: The secondary node (or the SN-CU) transmits an SN modification request acknowledge message to the master node. The message contains one or more of:
  SCG-Config; and
  optionally, information of an unreleased MCG split bearer, including at least the following information:
  identification of a bearer; and
  address information of a tunnel used to deliver data of a bearer on the SN side or the SN-DU side.

Step 4: The master node transmits an SN modification confirm message to the secondary node (or the SN-CU).

In the steps, the SCG-Config may be transmitted to the UE by the secondary node, and may also be transmitted to the UE by the master node. If the SCG-Config is transmitted by the secondary node: in one implementation, the secondary node transmits the SCG-Config generated after Step 2 to the UE, and it is unnecessary to contain the SCG-Config in Step 3; in another implementation, the secondary node first transmits the SCG-Config in Step 1 to the UE and then transmits the SCG-Config generated after Step 2 to the UE; in yet another implementation, the SCG-Config is contained in Step 3, but is transmitted by the secondary node after Step 3, and the secondary node adds, to the SN modification required message in Step 1 or the SN modification request acknowledge message in Step 3, an indication that the master node doesn't need to transmit the SCG-Config. If the SCG-Config is transmitted by the master node: in one implementation, the SCG-Config is contained in Step 3, and the master node transmits the SCG-Config received in Step 3; in another implementation, the master node first transmits the SCG-Config in Step 1 and then transmits the SCG-Config received in Step 3. The SCG-Config may also be transmitted by both the master node and the secondary node: in one implementation, the SCG-Config in Step 1 is transmitted by the master node and the SCG-Config generated after Step 2 is transmitted by the secondary node; in another implementation, the SCG-Config in Step 1 is transmitted by the secondary node and the SCG-Config generated after Step 2 is transmitted by the master node, so that the SCG-Config may be contained in Step 3.

A specific process of detailed Embodiment 5 (which includes four steps, i.e. Step 1 to Step 4, and in which there is SCG-Config in Step 1 and the SCG-Config is not updated in Step 3) is illustrated below.

Step 1: A secondary node (or an SN-CU) transmits an SN modification required message to a master node. The message contains the following information:
  information of a bearer to be released;
  optionally, SCG change indication which indicates change of a PSCell, or optionally, a new indication that the master node needs to trigger Step 2; if such indication is included in SN modification required message, it means that the step 1 is triggered in order to change PSCell at the SN side. Furthermore, "SCG change indication" is not the only possible name for such indication, as long as an indication included in SN modification required message can indicate to MN that such SN modification required message is triggered to change PSCell at the SN side. For example, it can be "PDCP change indication" since the PSCell change can cause the PDCP change. In addition, in case SN includes SN-CU and SN-DU, the PSCell change can be implemented at SN side first between SN-CU and SN-DU (the detailed procedure is shown in FIG. 8~FIG. 12, and the detailed description can be found below in this invention)
  SCG-Config; and
  optionally, information of an unreleased MCG split bearer, including at least the following information:
  identification of a bearer; and
  address information of a tunnel used to deliver data of a bearer on the SN side or the SN-DU side.

Among the above information, the SCG change indication is optional. Change of a PSCell for a UE or that the master node needs to trigger Step 2 may be implicitly indicated by containing information of an unreleased MCG split bearer and/or the SCG-Config in Step 1.

Step 2: The master node transmits an SN modification request message to the secondary node (or the SN-CU). The message contains one or more of:
  information of a new bearer;
  information of a bearer to be modified, which may include information of a bearer obtained after the bearer to be released in Step 1 is modified in bearer type;
  information of a bearer to be released;
  encryption key information for the secondary node;
  SCG change indication; and
  information for configuring an SCG (SCG-ConfigInfo).

Step 3: The secondary node (or the SN-CU) transmits an SN modification request acknowledge message to the master node. The message doesn't contain the SCG-Config and optionally may contain information of an unreleased MCG split bearer.

Step 4: The master node transmits an SN modification confirm message to the secondary node (or the SN-CU).

In the steps, the SCG-Config may be transmitted to the UE by the secondary node or by the master node. If the SCG-Config is transmitted by the secondary node: in one implementation, the secondary node may transmit the SCG-Config after Step 1/2/3/4, and optionally the secondary node may indicate in Step 1 or Step 3 that the master node doesn't need to transmit the SCG-Config to the UE; in another implementation, the SCG-Config is contained in Step 3, but is transmitted by the secondary node after Step 3, and the secondary node adds, to the SN modification request acknowledge message in Step 3, an indication that the master node doesn't need to transmit the SCG-Config. If the SCG-Config is transmitted by the master node, in one implementation, the master node may transmit the SCG-Config received in Step 1 after Step 1/2/3/4.

B. Signaling Flows Between a Central Unit and a Distributed Unit

The signaling flows include a UE context setup flow and a UE context modification flow. The two flows may be used in FIG. 8 to FIG. 12, respectively. However, the UE context setup flow and the UE context modification flow as introduced below may be not only used in the flows of FIG. 8 to FIG. 12, but also used in other cases in which UE context needs to be set up and modified between a central unit and a distributed unit.

B-1. UE Context Setup Flow

Figure 14:
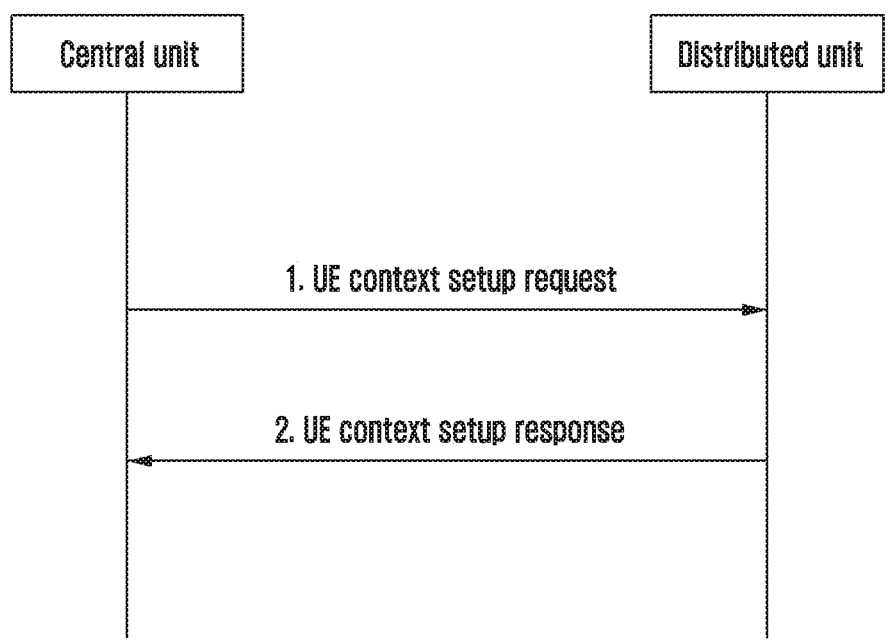
FIG. 14 illustrates a signaling flow of UE context setup between a central unit and a distributed unit according to an embodiment of the disclosure.

The flow includes two steps, as illustrated in FIG. 14.

Step 1: A central unit transmits a UE context setup request message to a distributed unit. The message contains one or more of:

information of a list of one or more cells, containing one or more of:

cell identification; and measurement result of a cell, for example, signal quality, signal strength, etc.;

information of a new cell transmitted by the CU, wherein the new cell may be a new cell determined by the CU and may also be a candidate new cell, and the information contains one or more of:

cell list information, containing identifications of one or more cells;

identification information of one or more PCells;

identification information of one or more SCells;

identification information of one or more PSCells;

identification information of one or more SCG SCells;

measurement information of a cell, for example, signal quality, signal strength, etc.;

context related to a UE bearer and/or identification, for example, information of a bearer for a UE, and identification information of a UE (such as an ID used by the UE on an interface between the CU and the DU, for example, CU UE F1AP ID which may be newly allocated by the CU, or have been allocated to the UE by the CU, or both); and information about a reason for the UE context setup, wherein the information may be for each cell or may also be for all modifications; and possible reasons include one or more of: cell overload, cell uplink/downlink overload, cell uplink control channel overload, load balancing, poor signal quality or strength of a UE in a cell, poor uplink/downlink signal quality or strength of a UE in a cell, etc.

Step 2: The distributed unit may determine whether to accept the request in Step 1 according to its own access control criteria and then reply to the central unit with a UE context setup response message. The message contains one or more of:

information of a new cell transmitted by the DU, which may contain one or more of:

an identification of a selected PCell; such selected PCell is determined by the DU. In one embodiment, such cell is selected as the PCell by the CU after receiving UE context setup response message; in another embodiment, such cell can be considered as the potential PCell by the CU after receiving UE context setup response message, e.g., such potential PCell may be selected as an (opportune) PCell by the CU; furthermore, such information can include identification of a list of selected PCell (e.g., Potential SpCell List), and the CU may take this information into account and select one of them as an (opportune) PCell.

identifications of one or more selected SCells;

an identification of a selected PSCell; such selected PSCell is determined by the DU. In one embodiment, such cell is selected as the PSCell by the CU; in another embodiment, such cell can be considered as the potential PSCell by the CU, e.g., such potential PSCell may be selected as an (opportune) PSCell by the CU; furthermore, such information can include identification of a list of selected PSCell (e.g., Potential SpCell List), and the CU may take this information into account and select one of them as an (opportune) PSCell.

identifications of one or more selected SCG SCells.

identification information of a refused cell indicating that the cell is not suitable to be allocated to the UE; in one embodiment, if there are multiple refused cell, the DU can include the identification information of a list of refused cells context related to a UE bearer, for example, information of a bearer for a UE; and information about a reason for performing the reply by the distributed unit, wherein the information may be for each cell or may also be for all modifications; and possible reasons include one or more of: cell overload, cell uplink/downlink overload, cell uplink control channel overload, load balancing, poor signal quality or strength of a UE in a cell, poor uplink/downlink signal quality or strength of a UE in a cell, etc.

The distributed unit sets up UE context according to the determined cell. In addition, if the distributed unit accepts content about cell configuration in the request message in Step 1, the distributed unit may not contain the information of the selected cell in the UE context setup response message replied in Step 2.

For above procedure, in one embodiment, the UE context setup request message can contain the identification information of one PCell/PSCell determined by the CU, the distributed unit should consider such cell as the PCell/PSCell and to determine whether it can accept such PCell/PSCell or not: in case the DU cannot accept such PCell/PSCell, the above UE Context Setup Response message can be another name, e.g., UE Context Setup Failure message.

For above procedure, in another embodiment, the UE context setup request message can contain the identification information of one PCell/PSCell determined by the CU, and the identification information of one or more candidate PCell/PSCells, the distributed unit should determine whether it can accept the PCell/PSCell determined by the CU or not. In case the DU cannot accept such PCell/PSCell, the above UE Context Setup Response message can be another name, e.g., UE Context Setup Failure message; moreover, the DU can include the identification of the selected PCell/PSCell in UE Context Setup Response message (or UE Context Setup Failure message). After CU receives such message, in one embodiment, such cell is selected as the PCell/PSCell by the CU; in another embodiment, such cell can be considered as the potential PCell/PSCell by the CU, e.g., such potential PCell/PSCell may be selected as an (opportune) PCell/PSCell by the CU. Moreover, if DU includes a list of selected PCells/PSCells (e.g., Potential SpCell List), the CU may take this information into account and select one of them as an (opportune) PCell/PSCell.

For above procedure, in addition to include identification information of PCell/PSCell, and identification information of one or more candidate PCell/PSCell, the UE context setup request message can include one or more SCells (it can be MCG SCells, or SCG SCells), and the DU can include the identification of refused cell (e.g., SCell Failed to Setup List).

Information content contained in the two steps may depend on the determination maker for cell configuration for the UE, as follows:

a. The Central Unit Determines the Cell Configuration for the UE.

The UE context setup request message in Step 1 contains one or more of:

information of a new cell transmitted by the CU, containing one or more of:

identification information of a PCell;
identification information of one or more SCells;
identification information of a PSCell;
identification information of one or more SCG SCells; and
measurement information of the cells;
context related to a UE bearer and/or identification, for example, information of a bearer for a UE, and identification information of a UE (such as an ID used by the UE on an interface between the CU and the DU, for example, CU UE F1AP ID which may be newly allocated by the CU, or have been allocated to the UE by the CU, or both); and
information about a reason for the UE context setup, wherein the information may be for each cell or may also be for all modifications; and possible reasons include one or more of: cell overload, cell uplink/downlink overload, cell uplink control channel overload, load balancing, poor signal quality or strength of a UE in a cell, poor uplink/downlink signal quality or strength of a UE in a cell, etc.

The UE context setup response message in Step 2 may contain one or more of:
identification information of a refused cell indicating that the cell is not suitable to be allocated to the UE;
context related to a UE bearer, for example, information of a bearer for a UE; and
information about a reason for performing the reply by the distributed unit, wherein the information may be for each cell or may also be for all modifications; and possible reasons include one or more of: cell overload, cell uplink/downlink overload, cell uplink control channel overload, load balancing, poor signal quality or strength of a UE in a cell, poor uplink/downlink signal quality or strength of a UE in a cell, etc.

In addition, if the distributed unit accepts content about cell configuration in the request message in Step 1, the distributed unit may not contain, in the UE context setup response message replied in Step 2, the information about the cell (i.e. the identification information of the refused cell) and/or other information (i.e. the context related to a UE bearer and the information about a reason for performing the reply by the distributed unit).

In another embodiment, the above procedure can be implemented as follows:

The UE context setup request message in Step 1 contains one or more of:
information of a new cell transmitted by the CU, containing one or more of:
identification information of a PCell;
identification information of one or more candidate PCells;
identification information of one or more SCells;
identification information of a PSCell;
identification information of one or more candidate PSCells;
identification information of one or more SCG SCells; and
measurement information of the cells;
context related to a UE bearer and/or identification, for example, information of a bearer for a UE, and identification information of a UE (such as an ID used by the UE on an interface between the CU and the DU, for example, CU UE F1AP ID which may be newly allocated by the CU, or have been allocated to the UE by the CU, or both); and
information about a reason for the UE context setup, wherein the information may be for each cell or may also be for all modifications; and possible reasons include one or more of: cell overload, cell uplink/downlink overload, cell uplink control channel overload, load balancing, poor signal quality or strength of a UE in a cell, poor uplink/downlink signal quality or strength of a UE in a cell, etc.

The UE context setup response message in Step 2 may contain one or more of:
identification information of a refused cell indicating that the cell is not suitable to be allocated to the UE; such cell can be SCell
an identification of a selected PCell; such selected PCell is determined by the DU. In one embodiment, such cell is selected as the PCell by the CU; in another embodiment, such cell can be considered as the potential PCell by the CU, e.g., such potential PCell may be selected as an (opportune) PCell by the CU; furthermore, such information can include identification of a list of selected PCell (e.g., Potential SpCell List), the CU may take this information into account and select one of them as an (opportune) PCell.
an identification of a selected PSCell; such selected PSCell is determined by the DU. In one embodiment, such cell is selected as the PSCell by the CU; in another embodiment, such cell can be considered as the potential PSCell by the CU, e.g., such potential PSCell may be selected as an (opportune) PSCell by the CU; furthermore, such information can include identification of a list of selected PSCell (e.g., Potential SpCell List), the CU may take this information into account and select one of them as an (opportune) PSCell
context related to a UE bearer, for example, information of a bearer for a UE; and
information about a reason for performing the reply by the distributed unit, wherein the information may be for each cell or may also be for all modifications; and possible reasons include one or more of: cell overload, cell uplink/downlink overload, cell uplink control channel overload, load balancing, poor signal quality or strength of a UE in a cell, poor uplink/downlink signal quality or strength of a UE in a cell, etc.

If the above step 2 is used to indicate that the DU refuses the PCell/PSCell (which is identified by "identification information of a PCell;" or "identification information of a PSCell") received from CU in step 1, the UE context setup response message in step 2 can be another message, e.g., UE context failure message.

b. The Distributed Unit Determines the Cell Configuration for the UE and the Central Unit Provides Only the Cell List.

The UE context setup request message in Step 1 contains one or more of:
information of a list of one or more cells, containing one or more of:
a cell identification; and
measurement information of a cell, for example, signal quality, signal strength, etc.;
context related to a UE bearer and/or identification, for example, information of a bearer for a UE, and identification information of a UE (such as an ID used by the UE on an interface between the CU and the DU, for example, CU UE F1AP ID which may be newly allocated by the CU, or have been allocated to the UE by the CU, or both); and information about a reason for the UE context setup, wherein the information may be for each cell or may also be for all modifications; and possible reasons include one or more of: cell overload, cell uplink/downlink overload, cell uplink control channel overload, load balancing, poor signal quality or strength of a UE in a cell, poor uplink/downlink signal quality or strength of a UE in a cell, etc.

The UE context setup response message in Step 2 may contain one or more of:
  information of a new cell transmitted by the DU, containing one or more of:
  identification information of a PCell;
  identification information of one or more SCells;
  identification information of a PSCell; and
  identification information of one or more SCG SCells;
  context related to a UE bearer, for example, information of a bearer for a UE; and
  information about a reason for performing the reply by the distributed unit, wherein the information may be for each cell or may also be for all modifications; and possible reasons include one or more of: cell overload, cell uplink/downlink overload, cell uplink control channel overload, load balancing, poor signal quality or strength of a UE in a cell, poor uplink/downlink signal quality or strength of a UE in a cell, etc.

The cells contained in Step 2 may be selected from the cell list given in Step 1, and may also be not from the cell list given in Step 1.

c. The Distributed Unit Determines the Cell Configuration for the UE and the Central Unit Provides the Candidate Cell List.

The UE context setup request message in Step 1 contains one or more of:
  information of a candidate new cell transmitted by the CU, containing one or more of:
  candidate cell list information, containing identifications of one or more cells;
  identification information of one or more candidate PCells;
  identification information of one or more candidate SCells;
  identification information of one or more candidate PSCells;
  identification information of one or more candidate SCG SCells; and
  measurement information of the cells, for example, signal quality, signal strength, etc.;
  context related to a UE bearer and/or identification, for example, information of a bearer for a UE, and identification information of a UE (such as an ID used by the UE on an interface between the CU and the DU, for example, CU UE F1AP ID which may be newly allocated by the CU, or have been allocated to the UE by the CU, or both); and
  information about a reason for the UE context setup, wherein the information may be for each cell or may also be for all modifications; and possible reasons include one or more of: cell overload, cell uplink/downlink overload, cell uplink control channel overload, load balancing, poor signal quality or strength of a UE in a cell, poor uplink/downlink signal quality or strength of a UE in a cell, etc.

The UE context setup response message in Step 2 may contain one or more of:
  information of a new cell transmitted by the DU, containing one or more of:
  identification information of a PCell;
  identification information of one or more SCells;
  identification information of a PSCell; and
  identification information of one or more SCG SCells;
  identification information of a refused cell indicating that the cell is not suitable to be allocated to the UE;
  context related to a UE bearer, for example, information of a bearer for a UE; and
  information about a reason for performing the reply by the distributed unit, wherein the information may be for each cell or may also be for all modifications; and possible reasons include one or more of: cell overload, cell uplink/downlink overload, cell uplink control channel overload, load balancing, poor signal quality or strength of a UE in a cell, poor uplink/downlink signal quality or strength of a UE in a cell, etc.

The cells contained in Step 2 may be selected from the candidate cells given in Step 1, and may also be not from the candidate cells given in Step 1. In addition, if the distributed unit accepts content about cell configuration in the request message in Step 1, the distributed unit may not contain, in the UE context setup response message replied in Step 2, the information about the cells (i.e. the information of a new cell transmitted by the DU and the identification information of a refused cell) and/or other information (i.e. the context related to a UE bearer and the information about a reason for performing the reply by the distributed unit).

Figure 15:
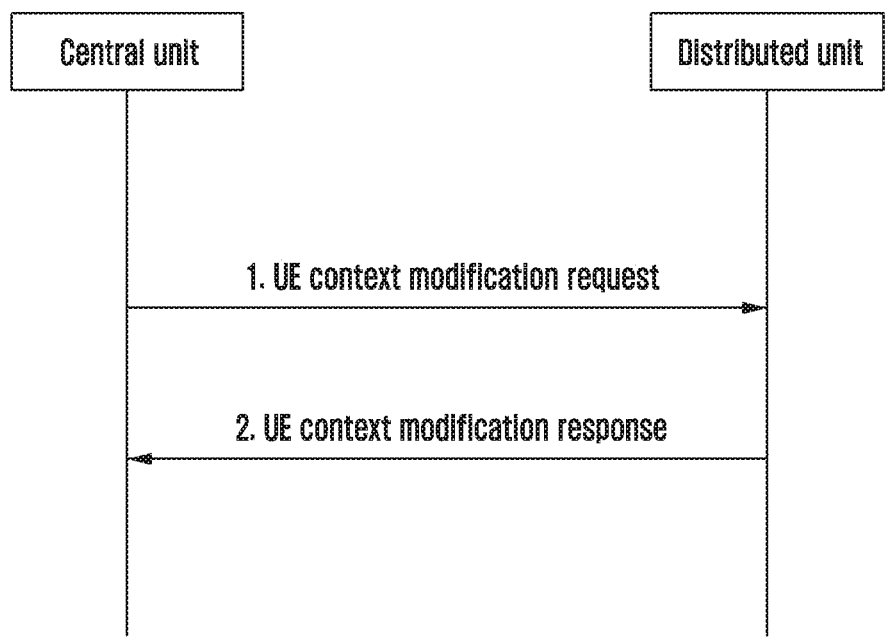
FIG. 15 illustrates a signaling flow of modification of UE context triggered by a central unit according to an embodiment of the disclosure.

B-2. UE Context Modification Flow, which May be Triggered by the Central Unit and May Also be Triggered by the Distributed Unit a. A Cell Configuration Modification Flow Triggered by the Central Unit Includes Two Steps, as Illustrated in FIG. 15:

Step 1: The central unit transmits a UE context modification request message to the distributed unit. The message contains one or more of:
  information of a list of one or more cells, containing one or more of:
  a cell identification; and
  measurement of a cell, for example, signal quality, signal strength, etc.;
  information of a new serving cell transmitted by the CU, wherein the new cell may be a new cell determined by the CU and may also be a candidate new cell, and the information contains one or more of:
  cell list information, containing identifications of one or more cells;
  identification information of one or more PCells;
  identification information of one or more SCells;
  identification information of one or more PSCells;
  identification information of one or more SCG SCells; and
  measurement information of the cells, for example, signal quality, signal strength, etc.;
  information of a serving cell to be modified, containing one or more of:
  an identification of a PCell to be modified;
  an identification of an SCell to be modified;
  an identification of a PSCell to be modified;
  an identification of an SCG SCell to be modified;
  an identification of a cell whose cell type changes, which indicates the type of the cell before and after modification, for example, an identification of a cell which changes from a PCell to an SCell, an identification of a cell which changes from an SCell to a PCell, an identification of a cell which changes from a PSCell to an SCG SCell, or an identification of a cell which changes from an SCG SCell to a PSCell; and
  measurement information of the cells, for example, signal quality, signal strength, etc.;
  information of a serving cell to be released, for example, a cell identification of a cell to be released;

context related to a UE bearer and/or identification, for example, information of a bearer for a UE, and identification information of a UE (such as an ID used by the UE on an interface between the CU and the DU, for example, CU UE F1AP ID which may be newly allocated by the CU, or have been allocated to the UE by the CU, or both); and information about a reason for modifying UE context, wherein the information may be for each cell or may also be for all modifications; and possible reasons include one or more of: cell overload, cell uplink/downlink overload, cell uplink control channel overload, load balancing, poor signal quality or strength of a UE in a cell, poor uplink/downlink signal quality or strength of a UE in a cell, etc.

Step 2: The distributed unit transmits a UE context modification response message to the central unit. The message may contain one or more of:

information of a new cell transmitted by the DU, containing one or more of:

a cell identification of an accepted new cell, or a cell identification of a new cell selected by the distributed unit, optionally indicating the type of the new cell, for example, a PCell, an SCell, a PSCell, or an SCG SCell; and a cell identification of a refused new cell;

information of a cell to be modified, containing one or more of:

a cell identification of an accepted cell to be modified; and
a cell identification of a refused cell to be modified;

information of a cell to be released, containing one or more of:

a cell identification of an accepted cell to be released; and
a cell identification of a refused cell to be released;

context related to a UE bearer, for example, information of a bearer for a UE; and information about a reason for performing the response, wherein the information may be for each cell or may also be for all modifications; and possible reasons include one or more of: cell overload, cell uplink/downlink overload, cell uplink control channel overload, load balancing, poor signal quality or strength of a UE in a cell, poor uplink/downlink signal quality or strength of a UE in a cell, etc.

Figure 16:
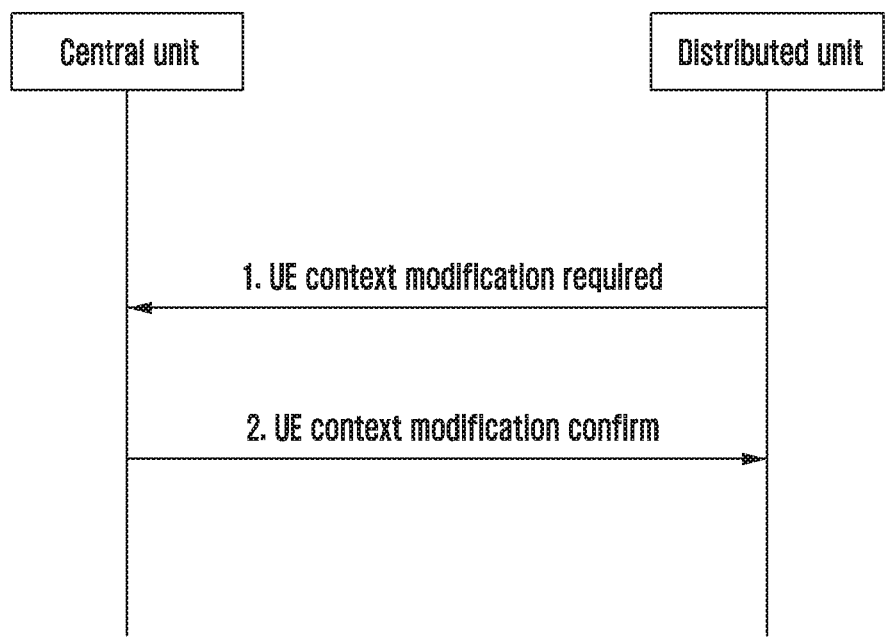
FIG. 16 illustrates a first signaling flow (in two steps) of modification of UE context triggered by a distributed unit according to an embodiment of the disclosure.

The accepted new cell in Step 2 may be obtained from the cell list information or the new serving cell contained in Step 1, and may also be another cell. The distributed unit may modify the UE context according to the information in Step 2. In addition, if the distributed unit accepts content about cell configuration in the request message in Step 1, the distributed unit may not contain, in the UE context modification response message replied in Step 2, the information about the cells (i.e. the information of a new cell transmitted by the DU, the information of a cell to be modified, and the information of a cell to be released) and/or other information (i.e. the context related to a UE bearer, and the information about a reason for performing the response by the distributed unit).

b. A Cell Configuration Modification Flow Triggered by the Distributed Unit Includes Two Steps, as Illustrated in FIG. 16:

Step 1: The distributed unit transmits a UE context modification required message to the central unit. The message contains one or more of:

information of a serving cell to be modified, containing one or more of:

an identification of a PCell to be modified;
an identification of an SCell to be modified;
an identification of a PSCell to be modified;
an identification of an SCG SCell to be modified;

an identification of a cell whose cell type changes, which indicates the type of the cell before and after modification, for example, an identification of a cell which changes from a PCell to an SCell, an identification of a cell which changes from an SCell to a PCell, an identification of a cell which changes from a PSCell to an SCG SCell, or an identification of a cell which changes from an SCG SCell to a PSCell; and measurement information of the cells, for example, signal quality, signal strength, etc.;

information of a serving cell to be released, for example, a cell identification of a cell to be released;

context related to a UE bearer, for example, information of a bearer for a UE; and information about a reason for modifying UE context, wherein the information may be for each cell or may also be for all modifications; and possible reasons include one or more of: cell overload, cell uplink/downlink overload, cell uplink control channel overload, load balancing, poor signal quality or strength of a UE in a cell, poor uplink/downlink signal quality or strength of a UE in a cell, etc.

Step 2: The central unit transmits a UE context modification confirm message to the distributed unit. The message may contain one or more of:

information of a cell to be modified, containing one or more of:

a cell identification of an accepted cell to be modified; and
a cell identification of a refused cell to be modified.

information of a cell to be released, containing one or more of:

a cell identification of an accepted cell to be released; and
a cell identification of a refused cell to be released.

context related to a UE bearer, for example, information of a bearer for a UE; and information about a reason for performing the response by the central unit, wherein the information may be for each cell or may also be for all modifications;

and possible reasons include one or more of: cell overload, cell uplink/downlink overload, cell uplink control channel overload, load balancing, poor signal quality or strength of a UE in a cell, poor uplink/downlink signal quality or strength of a UE in a cell, etc.

Figure 17:
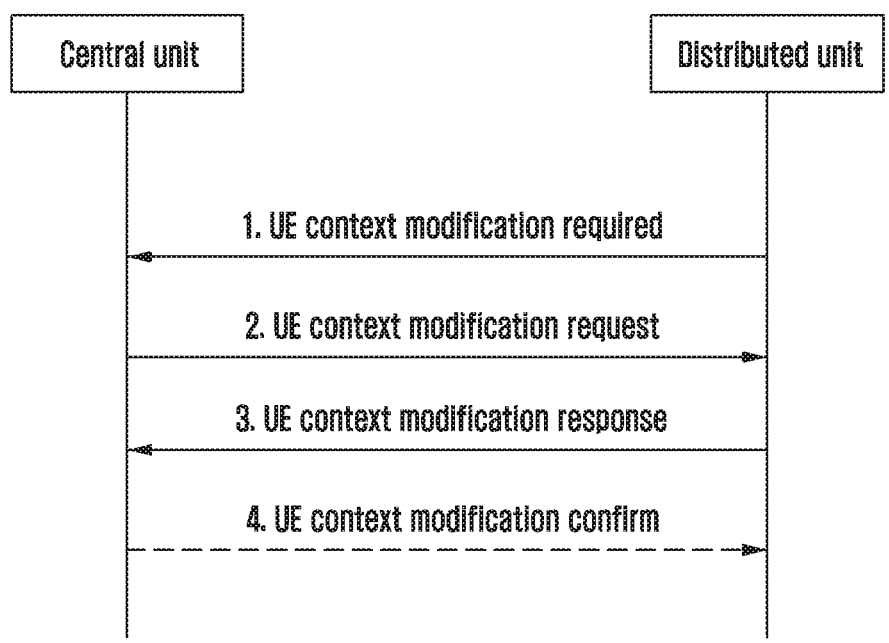
FIG. 17 illustrates a second signaling flow (in three or four steps) of modification of UE context triggered by a distributed unit according to an embodiment of the disclosure.

If the central unit accepts content about cell configuration in the required message in Step 1, the central unit may not contain, in the UE context modification confirm message replied in Step 2, the information about the cells (i.e. the information of a cell to be modified, and the information of a cell to be released) and/or other information (i.e. the context related to a UE bearer, and the information about a reason for performing the response by the central unit).

c. A Cell Configuration Modification Flow Triggered by the Distributed Unit Includes Three Steps or Four Steps, as Illustrated in FIG. 17:

Step 1: The distributed unit transmits a UE context modification required message to the central unit. The message contains one or more of:

information of a serving cell to be modified, containing one or more of:

an identification of a PCell to be modified;
an identification of an SCell to be modified;
an identification of a PSCell to be modified;
an identification of an SCG SCell to be modified;

an identification of a cell whose cell type changes, which indicates the type of the cell before and after modification, for example, an identification of a cell which changes from a PCell to an SCell, an identification of a cell which changes from an SCell to a PCell, an identification of a cell which changes from a PSCell to an SCG SCell, or an identification of a cell which changes from an SCG SCell to a PSCell; and measurement information of the cells, for example, signal quality, signal strength, etc.;

information of a serving cell to be released, for example, a cell identification of a cell to be released;

context related to a UE bearer, for example, information of a bearer for a UE; and information about a reason for modifying UE context, wherein the information may be for each cell or may also be for all modifications; and possible reasons include one or more of: cell overload, cell uplink/downlink overload, cell uplink control channel overload, load balancing, poor signal quality or strength of a UE in a cell, poor uplink/downlink signal quality or strength of a UE in a cell, etc.

Step 2: The central unit transmits a UE context modification request message to the distributed unit. The message contains one or more of:

information of a list of one or more cells, containing one or more of:

a cell identification; and measurement result of a cell, for example, signal quality, signal strength, etc.;

information of a new serving cell transmitted by the CU, wherein the new cell may be a new cell determined by the CU and may also be a candidate new cell, and the information contains one or more of:

cell list information, containing identifications of one or more cells;

identification information of one or more PCells;

identification information of one or more SCells;

identification information of one or more PSCells;

identification information of one or more SCG SCells; and measurement information of the cells, for example, signal quality, signal strength, etc.;

information of a serving cell to be modified, containing one or more of:

an identification of a PCell to be modified;

an identification of an SCell to be modified;

an identification of a PSCell to be modified;

an identification of an SCG SCell to be modified;

an identification of a cell whose cell type changes, which indicates the type of the cell before and after modification, for example, an identification of a cell which changes from a PCell to an SCell, an identification of a cell which changes from an SCell to a PCell, an identification of a cell which changes from a PSCell to an SCG SCell, or an identification of a cell which changes from an SCG SCell to a PSCell; and measurement information of the cells, for example, signal quality, signal strength, etc.;

information of a serving cell to be released, for example, a cell identification of a cell to be released;

context related to a UE bearer and/or identification, for example, information of a bearer for a UE, and identification information of a UE (such as an ID used by the UE on an interface between the CU and the DU, for example, CU UE F1AP ID which may be newly allocated by the CU, or have been allocated to the UE by the CU, or both); and information about a reason for modifying UE context, wherein the information may be for each cell or may also be for all modifications; and possible reasons include one or more of: cell overload, cell uplink/downlink overload, cell uplink control channel overload, load balancing, poor signal quality or strength of a UE in a cell, poor uplink/downlink signal quality or strength of a UE in a cell, etc.

The cells indicated by the information about the cells in Step 2 may include or not include the cells indicated by the information about the cells in Step 1.

Step 3: The distributed unit transmits a UE context modification response message to the central unit. The message may contain one or more of:

information of a new cell transmitted by the DU, containing one or more of:

a cell identification of an accepted new cell, or a cell identification of a new cell selected by the distributed unit, optionally indicating the type of the new cell, for example, a PCell, an SCell, a PSCell, or SCG SCell; and a cell identification of a refused new cell;

information of a cell to be modified, containing one or more of:

a cell identification of an accepted cell to be modified; and a cell identification of a refused cell to be modified;

information of a cell to be released, containing one or more of:

a cell identification of an accepted cell to be released; and a cell identification of a refused cell to be released;

context related to a UE bearer, for example, information of a bearer for a UE; and information about a reason for performing the response, wherein the information may be for each cell or may also be for all modifications; and possible reasons include one or more of: cell overload, cell uplink/downlink overload, cell uplink control channel overload, load balancing, poor signal quality or strength of a UE in a cell, poor uplink/downlink signal quality or strength of a UE in a cell, etc.

The accepted new cell in Step 3 may be obtained from the cell list information or the new serving cell contained in Step 2, and may also be another cell. The distributed unit may modify the UE context according to the information in Step 3. In addition, if the distributed unit accepts content about cell configuration in the request message in Step 2, the distributed unit may not contain, in the UE context modification response message replied in Step 3, the information about the cells (i.e. the information of a new cell transmitted by the DU, the information of a cell to be modified, and the information of a cell to be released) and/or other information (i.e. the context related to a UE bearer, and the information about a reason for performing the response by the distributed unit).

Step 4: The central unit transmits a UE context modification confirm message to the distributed unit. The step is optional, and the message may contain one or more of:

information of a new cell, containing one or more of:

a cell identification of an accepted new cell; and a cell identification of a refused new cell;

information of a cell to be modified, containing one or more of:

a cell identification of an accepted cell to be modified; and a cell identification of a refused cell to be modified;

information of a cell to be released, containing one or more of:

a cell identification of an accepted cell to be released; and a cell identification of a refused cell to be released;

context related to a UE bearer, for example, information of a bearer for a UE; and information about a reason for performing the response by the central unit, wherein the information may be for each cell or may also be for all modifications; and possible reasons include one or more of: cell overload, cell uplink/downlink overload, cell uplink control channel overload, load balancing, poor signal quality or strength of a UE in a cell, poor uplink/downlink signal quality or strength of a UE in a cell, etc.

The new cell and/or the cell to be modified and/or the cell to be released in Step 4 may be obtained from the new cell and/or the serving cell to be modified and/or the serving cell to be released in Step 3, and may also be another cell. The distributed unit may modify the UE context according to the information in Step 4. In addition, if the central unit accepts content about cell configuration in the response message in Step 3, the central unit may not contain, in the UE context modification confirm message replied in Step 4, the information about the cells (i.e. the information of a new cell, the information of a cell to be modified, and the information of a cell to be released) and/or other information (i.e. the context related to a UE bearer, and the information about a reason for performing the response by the central unit).

Figure 18:
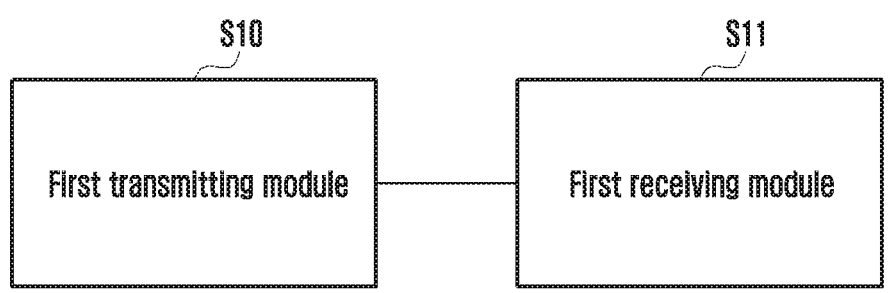
FIG. 18 is a schematic structure diagram of a device for switching a serving cell according to a third embodiment of the disclosure.

Further, the third embodiment of the disclosure provides a device for switching a serving cell, as illustrated in FIG. 18.

The device may comprise a first transmitting module S10 and a first receiving module S11. The first transmitting module S10 is configured to transmit, by a secondary node, a secondary node modification required message to a master node, so that the master node could switch a serving cell and release a bearer to be released according to the secondary node modification required message. The first receiving module S11 is configured to receive, by the secondary node, a secondary node modification confirm message returned by the master node with respect to the secondary node modification required message. According to an embodiment of the disclosure, the first transmitting module S10 and the first receiving module S11 are implemented as a transceiver.

In the device for switching a serving cell according to the third embodiment of the disclosure, a secondary node transmits a secondary node modification required message to a master node, so that the master node could switch a serving cell and release a bearer to be released according to the secondary node modification required message, which provides prerequisite guarantee for subsequently releasing a UE bearer on the secondary node while switching a serving cell according to the secondary node modification required message. The secondary node receives a secondary node modification confirm message returned by the master node with respect to the secondary node modification required message, so that, if there is a bearer to be released when a serving cell is switched, the serving cell could be switched and the bearer to be released on the secondary node could be released according to the secondary node modification required message, which greatly improves signaling transmission efficiency and saves signaling resources. According to an embodiment of the disclosure, the secondary node including the first transmitting module S10 and the first receiving module S11 may further comprises a controller configured to control an operation of the secondary node. The controller can be coupled with the first transmitting module S10 and the first receiving module S11 and be implemented in at least one processor included in the secondary node.

According to another embodiment of the disclosure, the secondary node may be composed of a CU and a DU each of which is in charge of different functions or layer of the secondary node. If the secondary node is split to the CU and the DU, the CU may comprise a transceiver and a controller to operate independently, and the CU also may comprise a transceiver and a controller to operate independently.

Figure 19:
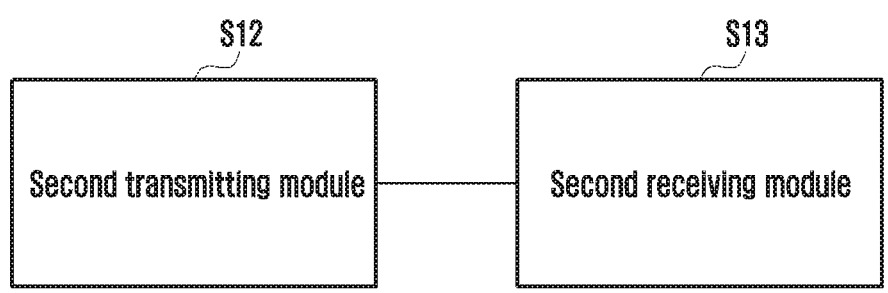
FIG. 19 is a schematic structure diagram of a device for switching a serving cell according to a fourth embodiment of the disclosure.
Figure 20:
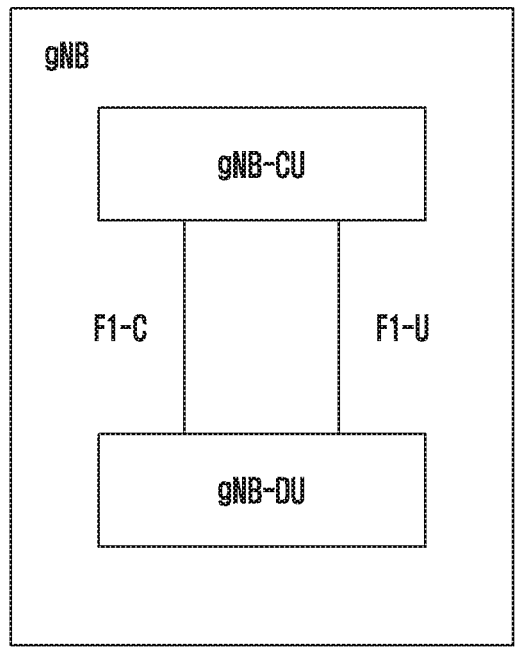
FIG. 20 is a schematic diagram illustrating the structure of a conventional gNB-CU and a conventional gNB-DU.

Further, the fourth embodiment of the disclosure provides a device for switching a serving cell, as illustrated in FIG. 19.

The device may comprise a second receiving module S13 and a second transmitting module S12. The second receiving module S13 is configured to receive, by a master node, a secondary node modification required message transmitted by a secondary node, and switch a serving cell and release a bearer to be released according to the secondary node modification required message. The second transmitting module S12 is configured to return, by the master node, to the secondary node a secondary node modification confirm message with respect to the secondary node modification required message. According to an embodiment of the disclosure, the second transmitting module S12 and the second receiving module S13 are implemented as a transceiver.

According to the fourth embodiment of the disclosure, if there is a bearer to be released when a serving cell is switched, the master node could switch a serving cell and release a bearer to be released on the secondary node according to the received secondary node modification required message, which greatly improves signaling transmission efficiency and saves signaling resources. According to an embodiment of the disclosure, the master node including the second transmitting module S12 and the second receiving module S13 may further comprises a controller configured to control an operation of the master node. The controller can be coupled with the second transmitting module S12 and the second receiving module S13 and be implemented in at least one processor included in the master node.

In a 5G network, a gNB may be composed of a CU and a DU which have different functions. A 5G network may also support a mechanism of on-demand system information message. In such mechanism, a user may send a specific random access preamble (PRACH preamble) or send a preamble on a specific random access resource (PRACH resource), or send a specific random access preamble on a specific random access resource to request the network for a system information message required by the user. If a gNB is divided into a CU and a DU, the DU may receive the random access preamble sent by a user, and need to interact with the CU to send the system information message requested by the user to the user because the system information message is generated by the CU. The present disclosure provides a method of interaction between a CU and a DU to support transmission of system information messages requested by users.

In the present disclosure, a system information message refers to a message including one or multiple SIBs, or refers to one or multiple SIBs.

The mechanism of the present disclosure is hereinafter described in detail with reference to several embodiments.

In one embodiment, the CU first configure all of on-demand system information messages at the DU.

Figure 21:
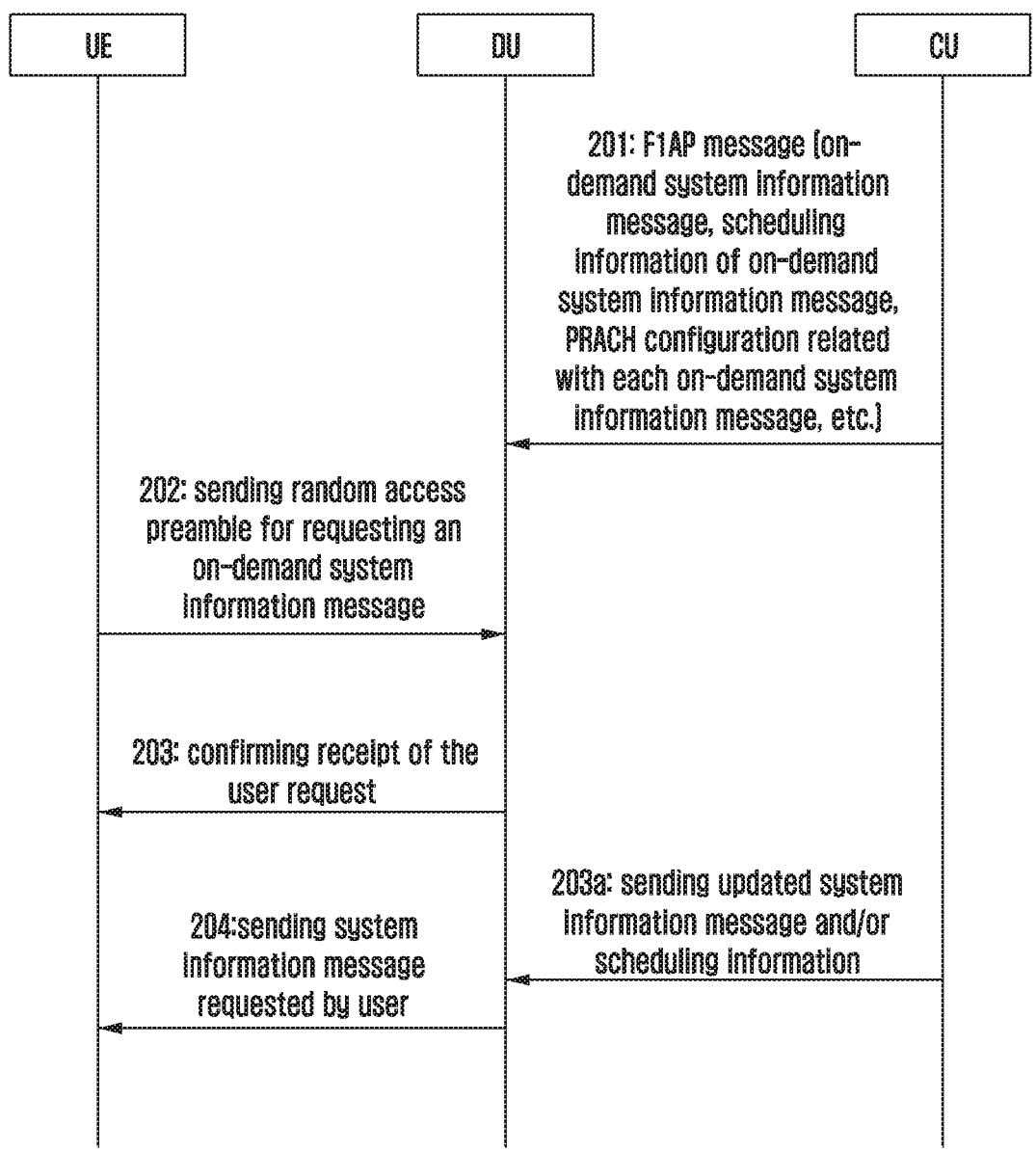
FIG. 21 is a flowchart illustrating a first method of supporting on-demand system information message executed by a CU and a DU according to the present disclosure.

This embodiment describes a first method supporting on-demand system information message executed by a CU and a DU. According to the method, the CU may send configurations of on-demand system information messages and PRACHs related with the on-demand system information messages to the DU via a F1 interface message (e.g., a F1 interface control plane message, i.e., F1-C message). After receiving a random access preamble (PRACH preamble) in connection with requesting a system information message, the DU sends the requested system information message to the user (e.g., via broadcasting, unicasting, or multicasting). The flowchart of the method is as shown in FIG. 21, and includes the following procedures.

In step 201, the CU sends a configuration of a system information message supporting on-demand transmission to the DU via a F1 interface message (e.g., F1-C message). The configuration may include one or multiple of:

1) each system information message supporting transmission in response to user request when the user has the demand, the system information message may include one SIB (e.g., LTE SIB4) or multiple SIBs (e.g., LTE SIB4, SIB5, SIB6, or the like), or may be one or multiple SIBs;

2) scheduling information of each system information message supporting user on-demand request, e.g., time position and/or frequency position and/or spatial position and/or periodicity, or the like for transmitting the system information message;

3) a configuration of a PRACH used in requesting a system information message, and a relationship which associates a PRACH configuration with each system information message supporting user on-demand request, the PRACH configuration may include information on a PRACH preamble and/or information on a PRACH resource (e.g., time-frequency resource for transmitting the PRACH preamble, spatial resource for transmitting the PRACH preamble). For example, PRACH configuration 1 is for requesting system information message 1, PRACH configuration 2 is for requesting system information message 2, or the like. In addition, a PRACH configuration may also be used for requesting multiple system information messages, e.g., PRACH configuration 3 may be used for requesting system information message 1 and system information message 2. Table 1 shows exemplary relationships associating PRACH configurations with on-demand system information messages.

TABLE 1

| PRACH configuration 1 | system information message 1 |
| PRACH configuration 2 | system information message 2 |
| PRACH configuration 3 | system information message 1 and system information message 2 |
| PRACH configuration 4 | system information message 2 and system information message 3 |
| PRACH configuration 5 | system information message 4 and system information message 5 |

In this step, the configuration information may be sent to the DU via the same F1 interface message, or via different F1 interface messages. In addition, if the configuration information is updated, the CU may send an update message to the DU to update the configuration information.

Before or after this step or in this step, it is supposed the CU or the DU has sent to the user the configuration of a PRACH used in requesting a system information message and a relation which associates the PRACH configuration with each system information message supporting user on-demand request.

In step 202, the user sends a random access preamble to the DU for requesting a system information message.

In this step, the user may send the random access preamble according to the required system information message and the received configuration information (for configurations of PRACHs used in requesting system information messages, and relations which associate PRACH configurations with each system information message supporting user on-demand request).

In step 203, the DU determines one or multiple system information messages requested by the user according to the random access preamble, and sends an acknowledgement message to the user. The acknowledgement message indicates at least one of:

1) confirming the network side (the CU and/or the DU and/or the gNB) is to send the system information message requested by the user;

2) confirming that the random access preamble sent by the user in step 202 has been received;

3) confirming that the random access preamble sent by the UE in step 202 has been received and that the request of the UE for the system information message is acknowledged;

4) confirming that the random access preamble sent by the user in step 202 has been received and that the one or multiple system information messages requested by the user are acknowledged (i.e., the system information message requested by the user is acknowledged);

5) confirming that the random access preamble sent by the user in step 202 has been received and that the one or multiple system information messages requested by the user are acknowledged and that the system information message requested by the user is stored in the DU (i.e., the DU stores the system information message requested by the user).

In step 204, the DU sends to the user the system information message requested by the user.

Before step 204, if the system information message and/or scheduling information stored in the DU has been changed, the CU may send the updated system information message and/or the scheduling information to the UE in step 203a.

In another embodiment, the CU informs the DU of the configuration of a PRACH used in requesting a system information message.

Figure 22:
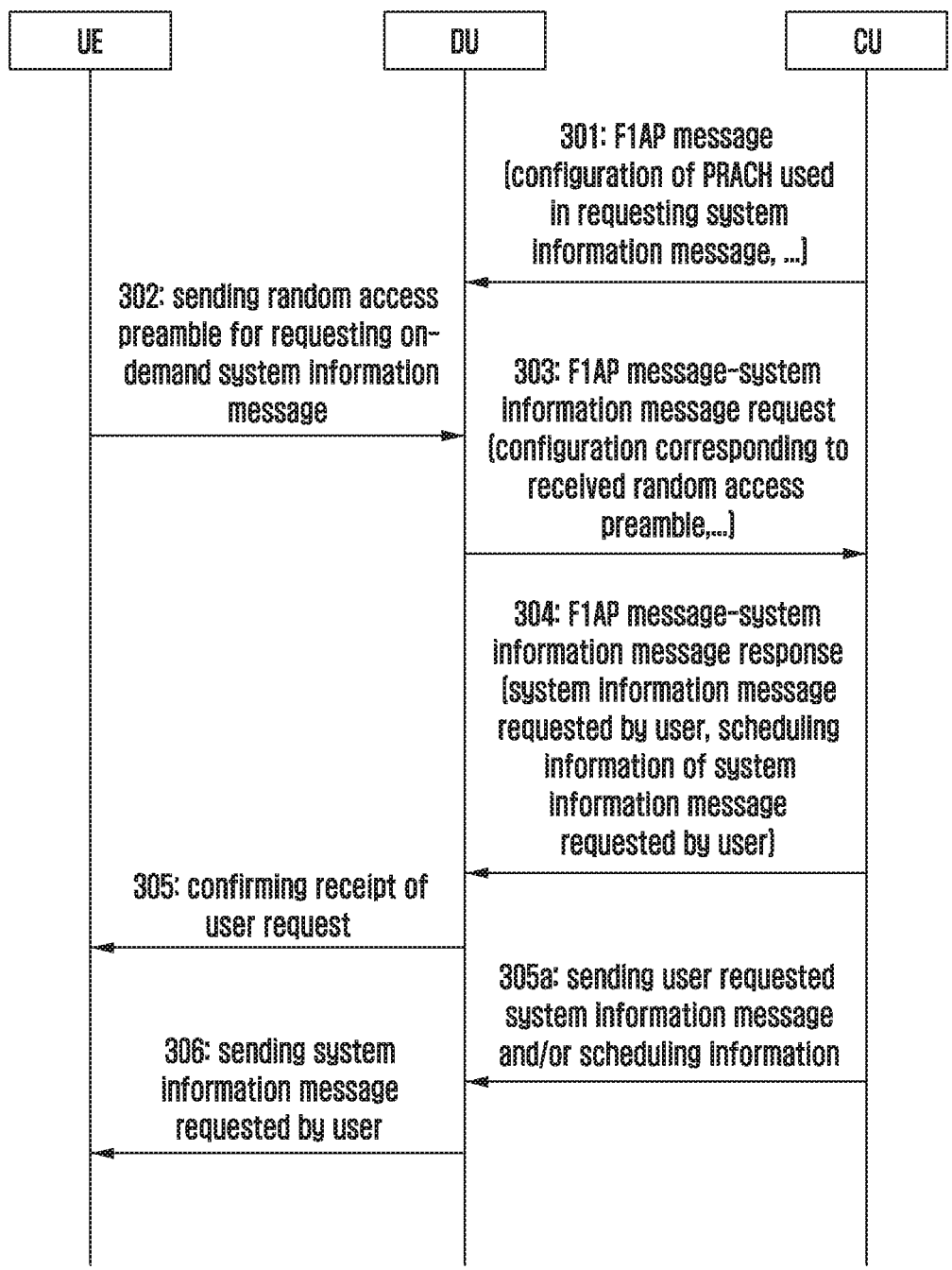
FIG. 22 is a flowchart illustrating a second method of supporting on-demand system information message executed by a CU and a DU according to the present disclosure.

This embodiment describes a second method supporting on-demand system information message executed by a CU and a DU. According to this method, the CU sends to the DU a configuration of a PRACH used in requesting a system information message. After receiving a random access preamble for requesting a system information message, the DU informs the CU of the configuration corresponding to the received random access preamble. The CU identifies the system information message requested by the user based on the configuration, and sends the system information message to the user via the DU. The flowchart of the method is as shown in FIG. 22, and includes the following procedures.

In step 301, the CU sends a F1 interface message to the DU. The F1 interface message includes configuration of a PRACH used in requesting a system information message. The configuration includes information on a PRACH preamble and/or information on a PRACH resource (e.g., position of a time-frequency resource for transmitting PRACH preamble, a spatial resource for transmitting a PRACH preamble). For example, the F1 interface message may include a PRACH configuration 1 and a PRACH configuration 2, or the like. Based on the information, the DU cannot obtain the relation between the PRACH configurations and the system information messages, and can only identify that a user is requesting a system information message when a random access preamble corresponding to one of the configurations is received.

Before or after this step or in this step, it is supposed the CU or the DU has sent to the user the configuration of a PRACH used in requesting a system information message and a relation which associates the PRACH configuration with each system information message supporting user on-demand request.

In step 302, the user sends a random access preamble to the DU for requesting a system information message.

In this step, the user may send the random access preamble according to the required system information message and the received configuration information (for configurations of PRACHs used in requesting system information messages, and relations which associate PRACH configurations with each system information message supporting user on-demand request).

In step 303, the DU sends a F1AP message (e.g., a system information message request) to the CU. The F1AP message may include the PRACH configuration (information on PRACH preamble and/or information on PRACH resource) corresponding to the random access preamble received by the DU. Optionally, the DU may specify the time of receiving a response message by one of the following:

manner 1: the message sent in step 303 includes clock information (e.g., time length information, time point information) to inform the CU of the last time point of sending a response message;

manner 2: after sending the message in step 303, the DU may start a timer and expect to receive a response message before the timer expires. Failing to receive a response message before the timer expires indicates the message sent in step 303 is not successfully received by the CU.

In step 304, the CU returns a response message (e.g., system information message response) to the DU. The response message indicates that the CU confirms receipt of the message sent by the DU in step 303. This step is optional. In addition, optionally, the response message may also include one or multiple of:

1) one or multiple system information messages requested by the user;

2) scheduling information of one or multiple system information messages requested by the user.

In step 305, the DU sends an acknowledgement message to the user. The acknowledgement message indicates at least one of:

1) confirming the network side (the CU and/or the DU and/or the gNB) is to send the system information message requested by the user;

2) confirming that the random access preamble sent by the user in step 302 has been received;

3) confirming that the random access preamble sent by the UE in step 302 has been received and that the request of the UE for the system information message is acknowledged;

4) confirming that the random access preamble sent by the UE in step 302 has been received and that the request of the UE for the system information message is acknowledged and that a request has been sent to the CU;

5) confirming that the random access preamble sent by the UE in step 302 has been received and that the request of the UE for the system information message is acknowledged and that a request has been sent to the CU and that the CU has acknowledged the request of the UE.

In step 306, the DU sends to the user the system information message requested by the user.

If the step 304 is omitted, or the system information message requested by the user is not sent in step 304, or the system information message requested by the user and/or scheduling information stored in the DU has an update, a step 305*a* may be performed before step 306. In step 305*a*, the CU sends the system information message requested by the user and/or scheduling information of the system information message to the DU. Then in step 306, the DU may send the system information message to the user.

If the CU fails to timely send the response message to the DU in step 304, the step 305 and step 306 are not executed.

In another embodiment, the CU informs the DU of the configuration of a PRACH used in requesting a system information message and an index of each configuration.

Figure 23:
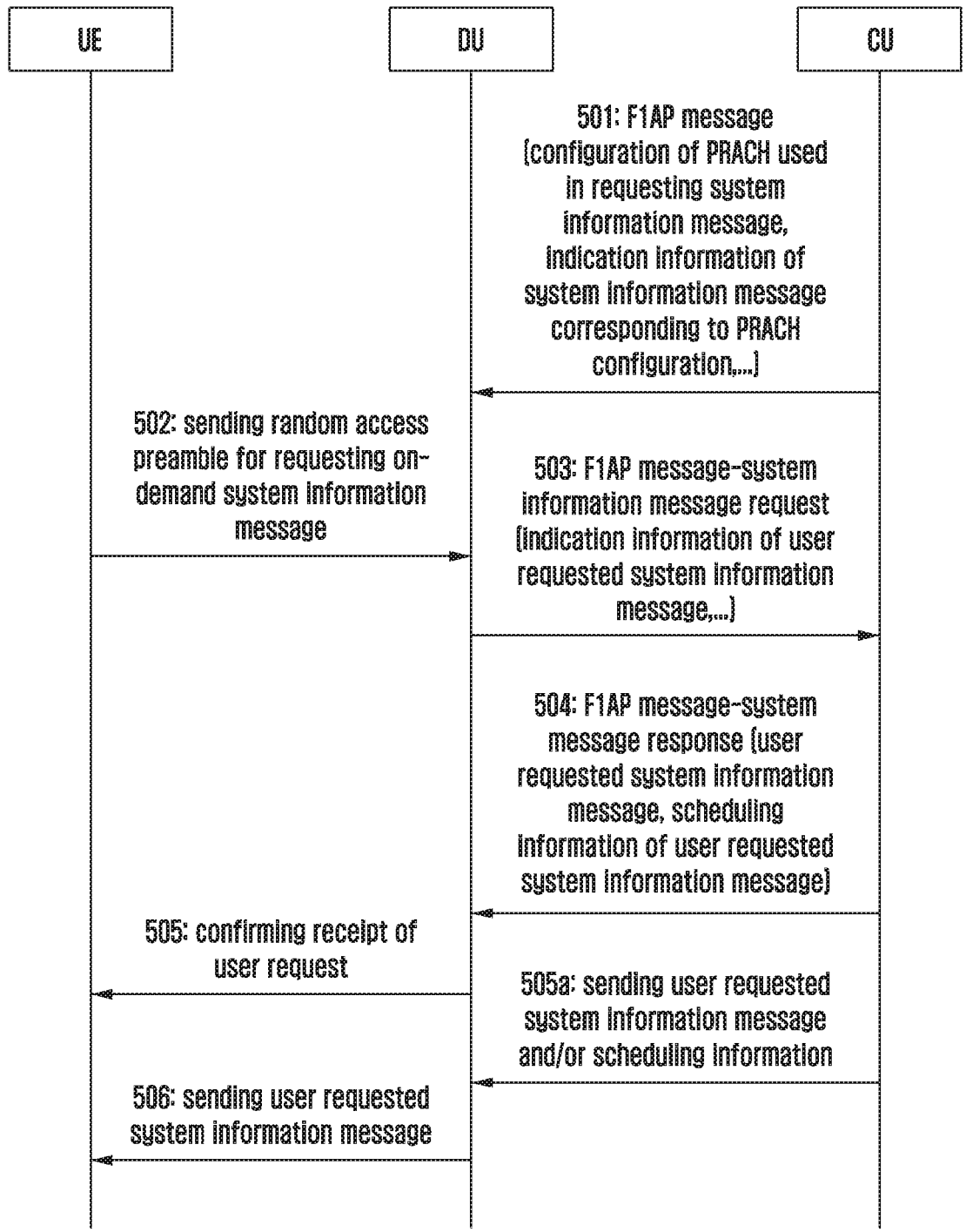
FIG. 23 is a flowchart illustrating a third method of supporting on-demand system information message executed by a CU and a DU according to the present disclosure.

This embodiment describes a third method supporting on-demand system information message executed by a CU and a DU. According to this method, the CU sends to the DU a configuration of a PRACH used in requesting a system information message and an index of each PRACH configuration. After receiving a random access preamble for requesting a system information message, the DU informs the CU of the index of the configuration corresponding to the received random access preamble. The CU identifies the system information message requested by the user based on the index, and sends the system information message to the user via the DU. The flowchart of the method is as shown in FIG. 23, and includes the following procedures.

In step 401, the CU sends a F1 interface message to the DU. The F1 interface message includes configuration of a PRACH used in requesting a system information message. The configuration includes information on a PRACH preamble and/or information on a PRACH resource (e.g., position of a time-frequency resource for transmitting PRACH preamble, a spatial resource for transmitting a PRACH preamble) and an index of each PRACH configuration. For example, the F1 interface message may include a PRACH configuration 1 and an index 1, and a PRACH configuration 2 and an index 2, or the like. Based on the information, the DU cannot obtain the relation between the PRACH configurations and the system information messages, and can only identify that a user is requesting a system information message when a random access preamble corresponding to one of the configurations is received.

Before or after this step or in this step, it is supposed the CU or the DU has sent to the user the configuration of a PRACH used in requesting a system information message and a relation which associates the PRACH configuration with each system information message supporting user on-demand request.

In step 402, the user sends a random access preamble to the DU for requesting a system information message.

In this step, the user may send the random access preamble according to the required system information message and the received configuration information (for configurations of PRACHs used in requesting system information messages, and relations which associate PRACH configurations with each system information message supporting user on-demand request).

In step 403, the DU sends a F1AP message (e.g., a system information message request) to the CU. The F1AP message may include the index of the PRACH configuration (information on PRACH preamble and/or information on PRACH resource) corresponding to the random access preamble received by the DU. Optionally, the DU may specify the time of receiving a response message by one of the following:

manner 1: the message sent in step 403 includes clock information (e.g., time length information, time point information) to inform the CU of the last time point of sending a response message;

manner 2: after sending the message in step 403, the DU may start a timer and expect to receive a response message before the timer expires. Failing to receive a response message before the timer expires indicates the message sent in step 403 is not successfully received by the CU.

In step 404, the CU returns a response message (e.g., system information message response) to the DU. The response message indicates the CU confirms receipt of the message sent by the DU in step 403. This step is optional. In addition, optionally, the response message may also include one or multiple of:

1) one or multiple system information messages requested by the user;

2) scheduling information of one or multiple system information messages requested by the user;

In step 405, the DU sends an acknowledgement message to the user. The acknowledgement message indicates at least one of:

1) confirming the network side (the CU and/or the DU and/or the gNB) is to send the system information message requested by the user;

2) confirming that the random access preamble sent by the user in step 402 has been received;

3) confirming that the random access preamble sent by the UE in step 402 has been received and that the request of the UE for the system information message is acknowledged;

4) confirming that the random access preamble sent by the UE in step 402 has been received and that the request of the UE for the system information message is acknowledged and that a request has been sent to the CU;

5) confirming that the random access preamble sent by the UE in step 402 has been received and that the request of the UE for the system information message is acknowledged and that a request has been sent to the CU and that the CU has acknowledged the request of the UE.

In step 406, the DU sends to the user the system information message requested by the user.

If step 404 is omitted, or the system information message is not sent in step 404, or the system information message requested by the user and/or scheduling information stored in the DU has an update, a step 405a may be executed before step 406. In step 405a, the CU sends the system information message requested by the user and/or scheduling information of the system information message to the DU, so that the DU sends to the user the system information message requested by the user in step 406.

If the CU fails to timely send the response message to the DU in step 404, the step 405 and step 406 are not executed.

In another embodiment, the CU informs the DU of a configuration of a PRACH used in requesting a system information message and indication information of a system information message corresponding to the configuration.

Figure 24:
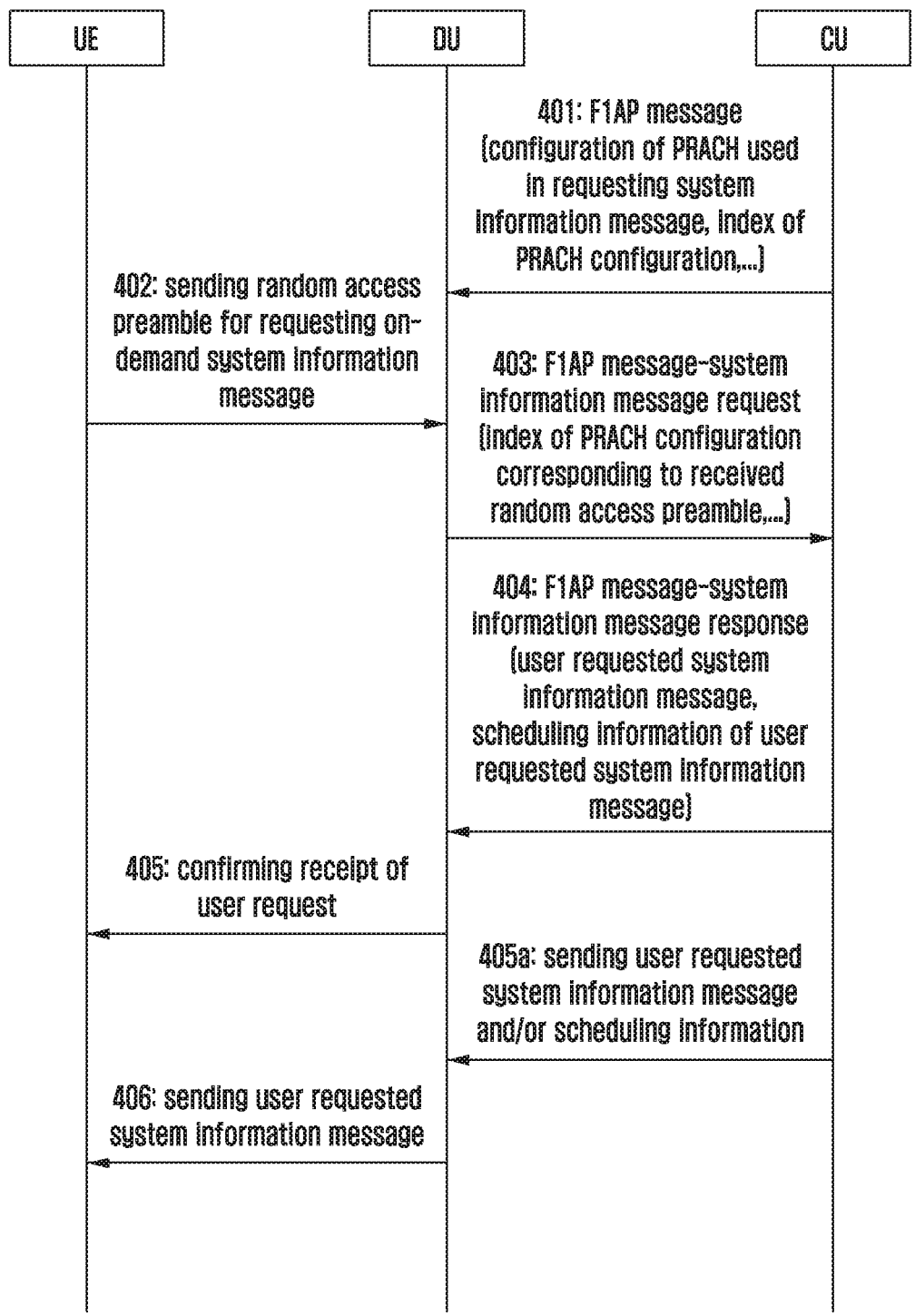
FIG. 24 is a flowchart illustrating a fourth method of supporting on-demand system information message executed by a CU and a DU according to the present disclosure.

This embodiment describes a fourth method supporting on-demand system information message executed by a CU and a DU. According to this method, the CU sends to the DU configurations of PRACHs used in requesting system information messages and indication information of a system information message corresponding to each PRACH configuration. After receiving a random access preamble for requesting a system information message, the DU identifies the system information message requested by the user based on the PRACH configurations and indication information of the system information messages sent by the CU, thus can inform the CU of the indication information of the system information message request by the user. The CU identifies the system information message based on the information provided by the DU, and sends the system information message to the user via the DU. The flowchart of the method is as shown in FIG. 24, and includes the following procedures.

In step 501, the CU sends a F1 interface message to the DU. The F1 interface message includes configuration of a PRACH used in requesting a system information message. The configuration includes information on a PRACH preamble and/or information on a PRACH resource (e.g., position of a time-frequency resource for transmitting PRACH preamble, a spatial resource for transmitting a PRACH preamble) and indication information of a system information message corresponding to each PRACH configuration (the indication information may be an index of the system information message). For example, the F1 interface message may include a PRACH configuration 1 and indication information indicating the PRACH configuration 1 is for requesting system information message 1, a PRACH configuration 2 and indication information indicating the PRACH configuration 2 is for requesting system information message 2, or the like. Based on the information, the DU can identify the system information message requested by the user.

Before or after this step or in this step, it is supposed the CU or the DU has sent to the user a configuration of a PRACH used in requesting a system information message and a relation which associates the PRACH configuration with a system information message supporting user on-demand request.

In step 502, the user sends a random access preamble to the DU for requesting a system information message.

In this step, the user may send the random access preamble according to the required system information message and the received configuration information (for configurations of PRACHs used in requesting system information messages, and relations which associate PRACH configurations with each system information message supporting user on-demand request).

In step 503, the DU sends a F1AP message (e.g., a system information message request) which includes the indication information of the system information message requested by the user. Optionally, the DU may specify the time of receiving a response message by one of the following:

manner 1: the message sent in step 503 includes clock information (e.g., time length information, time point information) to inform the CU of the last time point of sending a response message;

manner 2: after sending the message in step 503, the DU may start a timer and expect to receive a response message before the timer expires. Failing to receive a response message before the timer expires indicates the message sent in step 503 is not successfully received by the CU.

In step 504, the CU returns a response message (e.g., system information message response) to the DU. The response message indicates the CU confirms receipt of the message sent by the DU in step 503. This step is optional. In addition, optionally, the response message may also include one or multiple of:

1) one or multiple system information messages requested by the user;

2) scheduling information of one or multiple system information messages requested by the user;

In step 505, DU sends an acknowledgement message to the user. The acknowledgement message indicates at least one of:

1) confirming the network side (the CU and/or the DU and/or the gNB) is to send the system information message requested by the user;

2) confirming that the random access preamble sent by the user in step 502 has been received;

3) confirming that the random access preamble sent by the UE in step 502 has been received and that the request of the UE for the system information message is acknowledged;

4) confirming that the random access preamble sent by the UE in step 502 has been received and that the one or multiple system information messages requested by the UE have been acknowledged;

5) confirming that the random access preamble sent by the UE in step 502 has been received and that the one or multiple system information messages requested by the UE have been acknowledged and that a request has been sent to the CU;

6) confirming that the random access preamble sent by the UE in step 502 has been received and that the one or multiple system information messages requested by the UE have been acknowledged and that a request has been sent to the CU and that the CU has acknowledged the request of the UE.

In step 506, the DU sends to the user the system information message requested by the user.

If step 504 is omitted, or the system information message is not sent in step 504, or the system information message requested by the user and/or scheduling information stored in the DU has an update, a step 505a may be executed before step 506. In step 505a, the CU sends the system information message requested by the user and/or scheduling information of the system information message to the DU, so that the DU sends to the user the system information message requested by the user in step 506.

If the CU fails to timely send the response message to the DU in step 504, the step 505 and step 506 are not executed.

The present disclosure also provides devices corresponding to the above methods.

Figure 25:
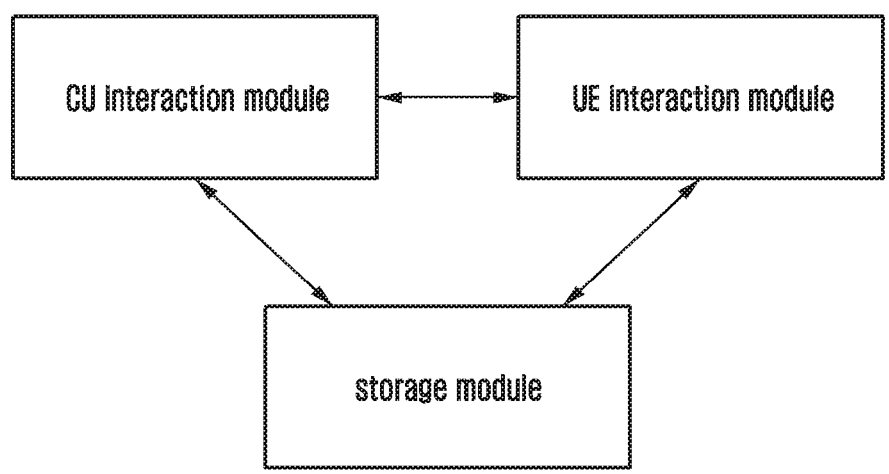
FIG. 25 is a schematic diagram illustrating modules of a gNB-DU according to an example of the present disclosure.

FIG. 25 is a schematic diagram illustrating the structure of a gNB-DU according to an embodiment of the present disclosure. The device includes: a CU interaction module, a UE interaction module and a storage module.

The CU interaction module receives, from a CU, a configuration of a PRACH used in requesting a system information message.

The storage module stores the configuration of the PRACH used in requesting a system information message.

The UE interaction module receives, from a UE, a random access preamble for requesting a system information message, determines the system information message requested by the UE based on the random access preamble and the configuration of the PRACH used in requesting the system information message, and sends the system information message requested by the UE to the UE.

Preferably, the CU interaction module may receive from the CU at least one of: a configuration of an on-demand system information message; an index of each PRACH configuration; an index of a system information message corresponding to a configuration of each PRACH used in requesting a system information message.

According to an embodiment of the disclosure, the CU interaction module and the UE interaction module are implemented as a transceiver. And, the gNB-DU may further comprise a controller which is coupled with the CU interaction module, the UE interaction module and the storage module and controls the operation of the gNB-DU.

Figure 26:
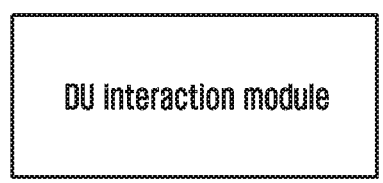
FIG. 26 is a schematic diagram illustrating modules of a gNB-CU according to an example of the present disclosure.

FIG. 26 is a schematic diagram illustrating the structure of a gNB-CU according to an embodiment of the present disclosure. The device includes: a DU interaction module.

The DU interaction module sends, to a DU, a configuration of a PRACH used in requesting a system information message.

Preferably, the DU interaction module may also send to the DU at least one of: a configuration of an on-demand system information message; an index of each PRACH configuration; an index of a system information message corresponding to a configuration of each PRACH used in requesting a system information message.

According to an embodiment of the disclosure, the DU interaction module is implemented as a transceiver. And, the gNB-CU may further comprise a controller which is coupled with the DU interaction module and controls the operation of the gNB-CU.

The method executed by a gNB-DU and a gNB-CU for supporting on-demand system information message and the devices can solve a problem as to how to support on-demand transmission of system information messages when a gNB is divided into a DU and a CU. The user may request a system information message using a random access preamble while system information messages are generated at the CU. The present disclosure provides the solution to the problem of how to interact using F1 interface messages to fulfill on-demand transmission of system information messages.

The scope of the claims should not be limited by the embodiments set forth in the examples, but should be given the broadest interpretation consistent with the description as a whole.

In another embodiment, when a user requests a system information message via a RRC message (i.e., requesting the system information messaging through Msg3 of the random access process), a gNB, after receiving the RRC message, may send a contention resolution message to the user to inform the user that the RRC message for requesting the system information message sent by the user has been correctly received by the gNB and the user may prepare receiving the requested system information message. The contention resolution message is generated by the MAC layer (e.g., a MAC CE including a contention resolution identity (Contention Resolution Identity MAC Control Element)), not a RRC message. When a gNB-CU and a gNB-DU are both standalone units, the gNB-DU may send the received RRC message for requesting the system information message to the gNB-CU. Under conventional mechanisms, however, the gNB-DU cannot obtain information on whether the gNB-CU has correctly received the RRC message, and thus the gNB-DU cannot send the contention resolution message to the user to inform the user whether the RRC message sent by the user for requesting the system information message has been correctly received. In order to address the problem, this embodiment provides the following mechanism.

Figure 27:
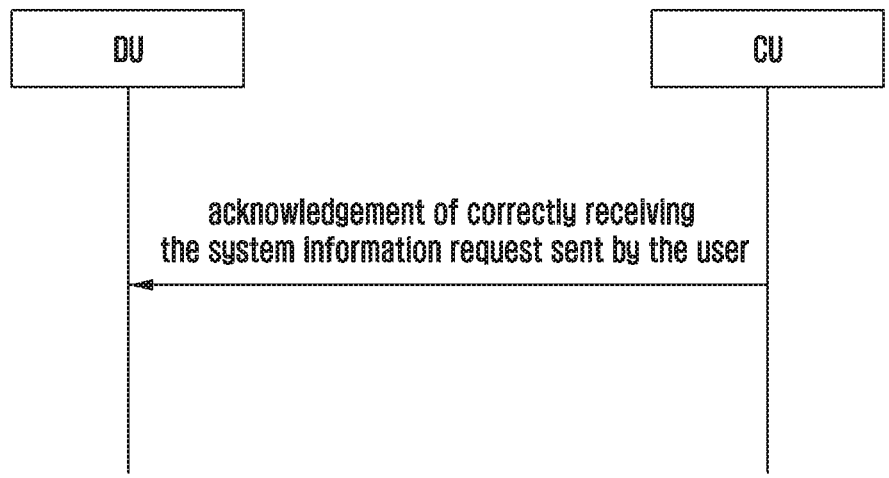
FIG. 27 is a schematic diagram illustrating an acknowledgement of receiving a system information request sent by a gNB-CU to a gNB-DU according to the present disclosure.

A gNB-CU sends to a gNB-DU an acknowledgement of correctly receiving the system information request sent by the user. As shown in FIG. 27, the message is for acknowledging the gNB-DU that the system information request sent by the gNB-DU has been correctly received by the gNB-CU. The acknowledgement may be implemented by a message including at least one of the following (the following information is specific to one user; if the acknowledgement includes confirmation to multiple users, the message may include at least one of the following for each user):

identity information of the user, e.g., identity information of the user at the gNB-DU side (gNB-DU UE F1AP ID), or identity information of the user in the cell (C-RNTI);

an identity of a cell where the user resides, e.g., NR-RAN Cell Global Identifier (NR CGI);

information indicating the system information message sent by the gNB-DU to the user, which indicates the system information message that the gNB-DU is required to send to the user.

Figure 28:
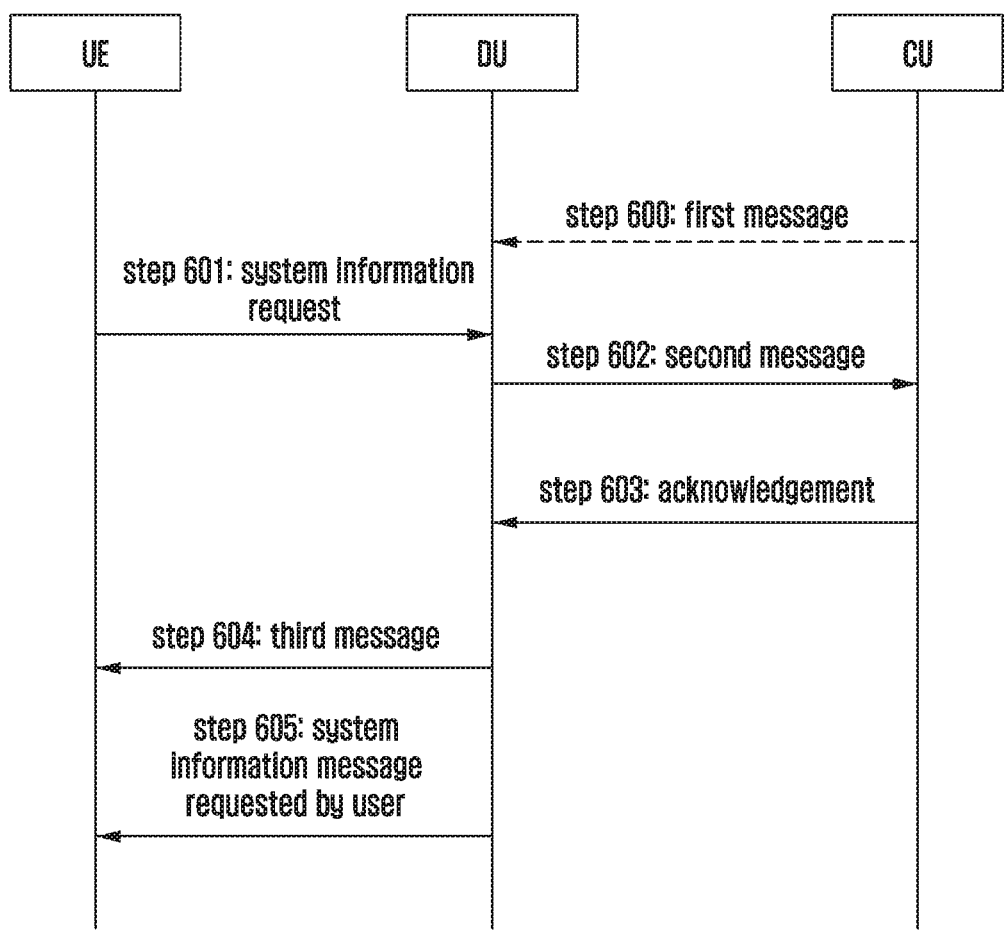
FIG. 28 is a flowchart illustrating a fifth method of supporting on-demand system information message executed by a gNB-CU and a gNB-DU according to the present disclosure.

Based on the above "the gNB-CU sends to the gNB-DU an acknowledgement of correctly receiving the system information request sent by the user", a user may request a system information message via a RRC message according to the following method (e.g., method five of supporting on-demand system information message between a gNB-CU and a gNB-DU), as shown in FIG. 28.

In step 601, a user sends a system information request (SystemInfoRequest) to a gNB-DU, the request is a RRC message which specifies a system information message requested by the user.

In step 602, the gNB-DU sends the system information request received in step 601 to a gNB-CU via a second message. The second message (e.g., an Initial UL RRC Message Transfer message) may include at least one of:
- identity information of the user, e.g., gNB-DU UE F1AP ID, or C-RNTI;
- an identity of a cell where the user resides, e.g., NR-RAN Cell Global Identifier (NR CGI);
- the RRC message sent by the user. In this embodiment, the RRC message is the system information request sent in step 601.

In step 603, the gNB-CU sends to the gNB-DU an acknowledgement of correctly receiving the system information request sent by the user. The message is for acknowledging the gNB-DU that the system information request sent by the gNB-DU has been correctly received by the gNB-CU. The acknowledgement may be implemented by a message including at least one of the following (the following information is specific to one user; if the acknowledgement includes confirmation to multiple users, the message may include at least one of the following for each user):
- identity information of the user, e.g., identity information of the user at the gNB-DU side (gNB-DU UE F1AP ID), or identity information of the user in the cell (C-RNTI);
- an identity of a cell where the user resides, e.g., NR-RAN Cell Global Identifier (NR CGI);]
- information indicating the system information message sent by the gNB-DU to the user, which indicates the system information message the gNB-DU is required to send to the user.

In step 604, the gNB-DU sends a third message to the user. The third message is for informing the UE that the system information request sent by the user has been correctly received. The third message may be a contention resolution message (e.g., a MAC CE including a contention resolution identity (Contention Resolution Identity MAC Control Element)).

In step 605, the gNB-DU sends a system information message requested by the user to the user. The system information message may be sent via broadcast or via unicast.

In the above steps, the execution order of step 604 and step 605 may be changed, or step 604 and step 605 may be carried out simultaneously.

Figure 29:
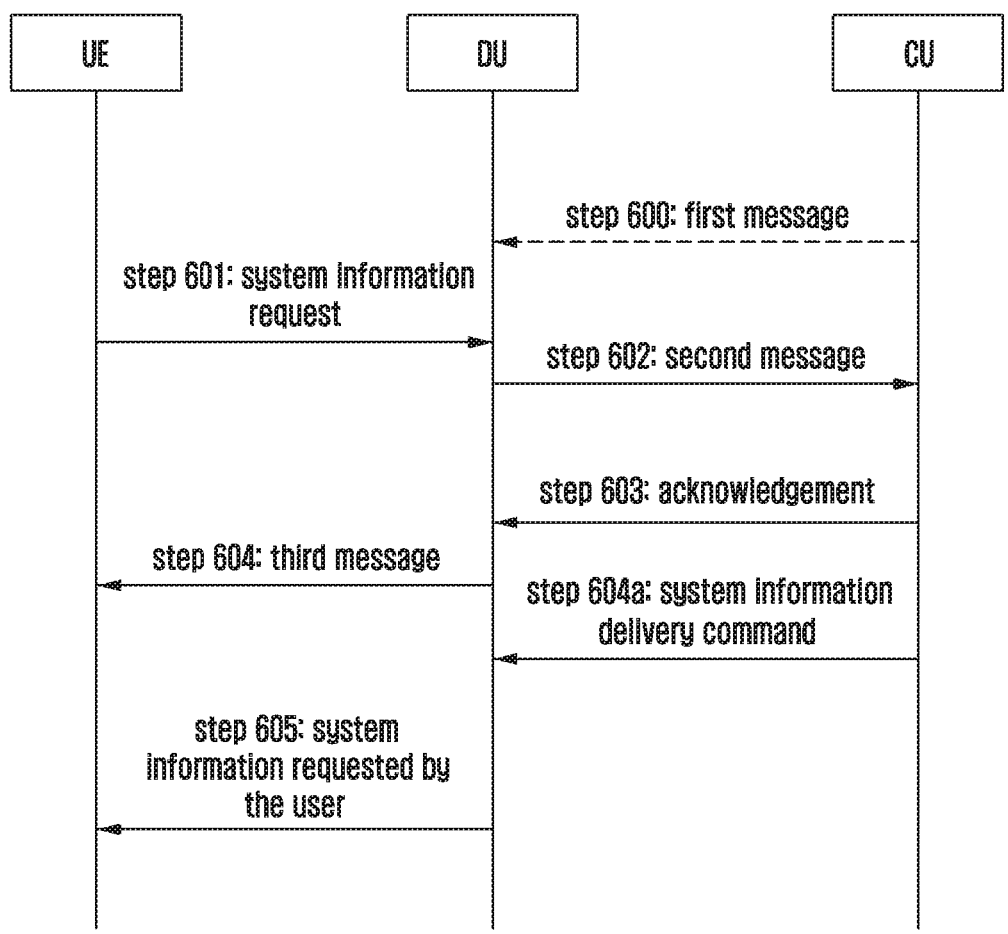
FIG. 29 is a flowchart illustrating a sixth method of supporting on-demand system information message executed by a gNB-CU and a gNB-DU according to the present disclosure.

In the above steps, when step 603 does not include the "information indicating the system information message sent by the gNB-DU to the user", the following step 604*a* may be performed after step 604, as shown in FIG. 29 (i.e., method six of supporting on-demand system information message between a gNB-CU and a gNB-DU).

In step 604*a*, the gNB-CU sends to the gNB-DU a system information delivery command which indicates the system information message to be sent by the gNB-DU to the user.

In the above steps, the execution order of step 604, step 604*a*, and step 605 may be changed, or step 604, step 604*a* and step 605 may be carried out simultaneously.

Before step 601, the process may also include a step 600, i.e., the gNB-CU sends a first message to the gNB-DU. The first message includes a system information message and/or information related with scheduling of a system information message.

It should be understood by those skilled in the art that the disclosure involves apparatuses for performing one or more of operations as described in the present application. Those apparatuses may be specially designed and manufactured as intended, or may comprise known apparatuses in a general-purpose computer. Those apparatuses have computer programs stored therein, which are selectively activated or reconstructed. Such computer programs may be stored in device (such as computer) readable media or in any type of media suitable for storing electronic instructions and respectively coupled to a bus, and the computer readable media include but are not limited to any type of disks (including floppy disks, hard disks, optical disks, CD-ROM and magneto-optical disks), ROM (Read-Only Memory), RAM (Random Access Memory), EPROM (Erasable Programmable Read-Only Memory), EEPROM (Electrically Erasable Programmable Read-Only Memory), flash memories, magnetic cards or optical cards. That is, readable media include any media storing or transmitting information in a device (for example, computer) readable form.

It may be understood by those skilled in the art that computer program instructions may be used to realize each block in structure diagrams and/or block diagrams and/or flowcharts as well as combination of blocks in the structure diagrams and/or block diagrams and/or flowcharts. It may be understood by those skilled in the art that these computer program instructions may be provided to general-purpose computers, special computers or other processors of programmable data processing means, so that solutions designated in a block or blocks of the structure diagrams and/or block diagrams and/or flowcharts are implemented by computers or other processors of programmable data processing means.

It may be understood by those skilled in the art that the operations, methods, steps in the flows, measures and solutions already discussed in the disclosure may be alternated, changed, combined or deleted. Further, the operations, methods, other steps in the flows, measures and solutions already discussed in the disclosure may also be alternated, changed, rearranged, decomposed, combined or deleted. Further, prior arts having the operations, methods, the steps in the flows, measures and solutions disclosed in the disclosure may also be alternated, changed, rearranged, decomposed, combined or deleted.

The foregoing description covers merely some embodiments of the disclosure. It should be noted that, for those skilled in the art, various modifications and embellishments may be made without departing from the principle of the disclosure. Such modifications and embellishments shall be regarded as falling in the scope of the disclosure.

What is claimed is:

1. A method performed by a network entity corresponding to a central unit (CU) of a secondary node (SN) in a wireless communication system, the method comprising:
   transmitting, to a network entity corresponding to a distributed unit (DU) of the SN via an F1 interface, a request message for requesting a context setup of a terminal that includes a first list of at least one candidate primary secondary cell (PSCell) and a second list of at least one secondary cell (SCell) to be setup;
   receiving, from the network entity corresponding to the DU via the F1 interface, a response message for confirming the context setup of the terminal that includes a third list of at least one SCell failed to setup and a cause for each SCell of the at least one SCell failed to setup in the third list; and transmitting, to a network entity corresponding to a master node (MN) associated with the SN, a message for requesting a modification of the SN based on the response message.

2. The method of claim 1,
wherein the message for requesting the modification of the SN includes secondary cell group (SCG) configuration information, a list of at least one bearer to be modified, and information on a tunnel endpoint at the SCG for delivering data of the at least one bearers, and
wherein the method further comprises receiving, from the network entity corresponding to the MN, a message for confirming the modification of the SN as a response to the message for requesting the modification of the SN.

3. The method of claim 2, further comprising:
transmitting, to the network entity corresponding to the DU via the F1 interface, a message for requesting a context modification of the terminal that includes a fourth list of at least one SCell to be setup; and
receiving, from the network entity corresponding to the DU via the F1 interface, a message for confirming the context modification of the terminal that includes a fifth list of at least one SCell failed to setup.

4. The method of claim 3,
wherein the message for confirming the context modification of the terminal further includes a cause associated with the fifth list of at least one SCell failed to setup included in the message for confirming the context modification of the terminal, and
wherein the cause associated with the fifth list indicates an overload of an SCell failed to setup by the network entity corresponding to the DU.

5. The method of claim 2, wherein the tunnel endpoint is used for delivering downlink data of the at least one bearer to the terminal.

6. The method of claim 1,
wherein the cause indicates an overload of an SCell failed to setup by the network entity corresponding to the DU.

7. A network entity corresponding to a central unit (CU) of a secondary node (SN) in a wireless communication system, the network entity corresponding to the CU comprising:
a transceiver configured to transmit and receive a signal; and
at least one processor configured to:
transmit, to a network entity corresponding to a distributed unit (DU) of the SN via the transceiver via an F1 interface, a request message for requesting a context setup of a terminal that includes a first list of at least one candidate primary secondary cell (PS-Cell) and a second list of at least one secondary cell (SCell) to be setup,
receive, from the network entity corresponding to the DU via the transceiver via the F1 interface, a response message for confirming the context setup of the terminal that includes a third list of at least one SCell failed to setup and a cause for each SCell of the at least one SCell failed to setup in the third list, and
transmit, to a network entity corresponding to a master node (MN) associated with the SN, a message for requesting a modification of the SN based on the response message.

8. The network entity corresponding to the CU of claim 7,
wherein the message for requesting the modification of the SN includes secondary cell group (SCG) configuration information, a list of at least one bearer to be modified, and information on a tunnel endpoint at the SCG for delivering data of the at least one bearer, and
wherein the at least one processor is further configured to receive, from the network entity corresponding to the MN via the transceiver, a message for confirming the modification of the SN as a response to the message for requesting the modification of the SN.

9. The network entity corresponding to the CU of claim 8,
wherein the at least one processor is further configured to:
transmit, to the network entity corresponding to the DU via the transceiver via the F1 interface, a message for requesting a context modification of the terminal that includes a fourth list of at least one SCell to be setup, and
receive, from the network entity corresponding to the DU via the transceiver via the F1 interface, a message for confirming the context modification of the terminal that includes a fifth list of at least one SCell failed to setup.

10. The network entity corresponding to the CU of claim 9,
wherein the message for confirming the context modification of the terminal further includes a cause associated with the fifth list of at least one SCell failed to setup included in the message for confirming the context modification of the terminal, and
wherein the cause associated with the fifth list indicates an overload of an SCell failed to setup by the network entity corresponding to the DU.

11. The network entity corresponding to the CU of claim 8, wherein the tunnel endpoint is used for delivering downlink data of the at least one bearer to the terminal.

12. The network entity corresponding to the CU of claim 7,
wherein the cause indicates an overload of an SCell failed to setup by the network entity corresponding to the DU.

13. A network entity corresponding to a distributed unit (DU) of a secondary node (SN) in a wireless communication system, the network entity corresponding to the DU comprising:
a transceiver configured to transmit and receive a signal; and
at least one processor configured to:
receive, from a network entity corresponding to a central unit (CU) of the SN via the transceiver via an F1 interface, a request message for requesting a context setup of a terminal that includes a first list of at least one candidate primary secondary cell (PS-Cell) and a second list of at least one secondary cell (SCell) to be setup, and
transmit, to the network entity corresponding to the CU via the transceiver via the F1 interface, a response message for confirming the context setup of the terminal that includes a third list of at least one SCell failed to setup and a cause for each SCell of the at least one SCell failed to setup in the third list,
wherein a message for requesting a modification of the SN is transmitted to a network entity corresponding to a master node (MN) associated with the SN from the network entity corresponding to the CU based on the response message.

14. The network entity corresponding to the DU of claim 13,
wherein the message for requesting the modification of the SN includes secondary cell group (SCG) configuration information, a list of at least one bearer to be modified, and information on a tunnel endpoint at the SCG for delivering data of the at least one bearer, and
wherein a message for confirming the modification of the SN is transmitted from the network entity corresponding to the MN to the network entity corresponding to the CU as a response to the message for requesting the modification of the SN.

15. The network entity corresponding to the DU of claim 14, wherein the at least one processor is further configured to:
receive, from the network entity corresponding to the CU via the transceiver via the F1 interface, a message for requesting a context modification of the terminal that includes a fourth list of at least one SCell to be setup, and
transmit, to the network entity corresponding to the CU via the transceiver via the F1 interface, a message for confirming the context modification of the terminal that includes a fifth list of at least one SCell failed to setup.

16. The network entity corresponding to the DU of claim 15,
wherein the message for confirming the context modification of the terminal further includes a cause associated with the fifth list of at least one SCell failed to setup included in the message for confirming the context modification of the terminal, and
wherein the cause associated with the fifth list indicates an overload of an SCell failed to setup by the network entity corresponding to the DU.

17. The network entity corresponding to the DU of claim 14, wherein the tunnel endpoint is used for delivering downlink data of the at least one bearer to the terminal.

18. The network entity corresponding to the DU of claim 13,
wherein the cause indicates an overload of an SCell failed to setup by the network entity corresponding to the DU.

19. A terminal in a wireless communication system, the terminal comprising:
a transceiver configured to transmit and receive a signal; and
at least one processor configured to:
communicate with a master node (MN) and a secondary node (SN) connected with the terminal,
wherein a request message for requesting a context setup of the terminal is transmitted from a network entity corresponding to a central unit (CU) of the SN to a network entity corresponding to a distributed unit (DU) of the SN via an F1 interface, the request message for requesting the context setup of the terminal including a first list of at least one candidate primary secondary cell (PSCell) and a second list of at least one secondary cell (SCell) to be setup, and
wherein a response message for confirming the context setup of the terminal is transmitted from the network entity corresponding to the DU to the network entity corresponding to the CU via the F1 interface, the response message for confirming the context setup of the terminal including a third list of at least one SCell failed to setup and a cause for each SCell of the at least one SCell failed to setup in the third list,
wherein a message for requesting a modification of the SN is transmitted from the network entity corresponding to the CU to a network entity corresponding to the MN based on the response message.

20. The terminal of claim 19,
wherein the message for requesting the modification of the SN includes secondary cell group (SCG) configuration information, a list of at least one bearer to be modified, and information on a tunnel endpoint at the SCG for delivering data of the at least one bearer, and
wherein a message for confirming the modification of the SN is transmitted from the network entity corresponding to the MN to the network entity corresponding to the CU, as a response to the message for requesting the modification of the SN.

21. The terminal of claim 20,
wherein a message for requesting a context modification of the terminal is transmitted from the network entity corresponding to the CU to the network entity corresponding to the DU via the F1 interface, the message for requesting the context modification of the terminal including a fourth list of at least one SCell to be setup, and
wherein a message for confirming the context modification of the terminal is transmitted from the network entity corresponding to the DU to the network entity corresponding to the CU via the F1 interface, the message for confirming the context modification of the terminal including a fifth list of at least one SCell failed to setup.

22. The terminal of claim 21,
wherein the message for confirming the context modification of the terminal further includes a cause associated with the fifth list of at least one SCell failed to setup included in the message for confirming the context modification of the terminal, and
wherein the cause associated with the fifth list indicates an overload of an SCell failed to setup by the network entity corresponding to the DU.

23. The terminal of claim 20, wherein the tunnel endpoint is used for delivering downlink data of the at least one bearer to the terminal.

24. The terminal of claim 19,
wherein the cause indicates an overload of an SCell failed to setup by the network entity corresponding to the DU.

* * * * *